United States Patent
Wegmann et al.

(10) Patent No.: US 12,543,655 B2
(45) Date of Patent: Feb. 10, 2026

(54) CONTROLLING TRANSFER OF MATERIAL FROM A TRANSFER VEHICLE TO A HAULAGE VEHICLE BASED ON AN INTERNAL PROFILE OF THE HAULAGE VEHICLE

(71) Applicant: Deere & Company, Moline, IL (US)

(72) Inventors: Riley J. Wegmann, Urbana, IA (US); William J. Vande Haar, Janesville, IA (US); Moresh Kolhe, Pune (IN)

(73) Assignee: DEERE & COMPANY, Moline, IL (US)

( * ) Notice: Subject to any disclaimer, the term of this patent is extended or adjusted under 35 U.S.C. 154(b) by 145 days.

(21) Appl. No.: 18/495,229

(22) Filed: Oct. 26, 2023

(65) Prior Publication Data
US 2024/0138312 A1    May 2, 2024

Related U.S. Application Data

(63) Continuation-in-part of application No. 18/465,580, filed on Sep. 12, 2023.

(60) Provisional application No. 63/512,368, filed on Jul. 7, 2023, provisional application No. 63/381,178, filed on Oct. 27, 2022, provisional application No. 63/381,187, filed on Oct. 27, 2022.

(51) Int. Cl.
A01D 90/10    (2006.01)

(52) U.S. Cl.
CPC .................................. A01D 90/10 (2013.01)

(58) Field of Classification Search
None
See application file for complete search history.

(56) References Cited

U.S. PATENT DOCUMENTS

| | | | |
|---|---|---|---|
| 8,032,255 | B2 | 10/2011 | Phelan et al. |
| 8,060,283 | B2 | 11/2011 | Mott et al. |
| 8,126,620 | B2 | 2/2012 | Ringwald et al. |
| 8,380,401 | B2 | 2/2013 | Pighi et al. |
| 8,626,406 | B2 | 1/2014 | Schleicher et al. |
| 8,662,972 | B2 | 3/2014 | Behnke et al. |
| 8,868,304 | B2 | 10/2014 | Bonefas |
| 9,043,096 | B2 | 5/2015 | Zielke et al. |
| 9,049,817 | B2 | 6/2015 | McCully et al. |
| 9,119,342 | B2 | 9/2015 | Bonefas |
| 9,169,032 | B2 | 10/2015 | Gengerke |
| 9,185,845 | B2 | 11/2015 | Van Mill et al. |

(Continued)

FOREIGN PATENT DOCUMENTS

| | | |
|---|---|---|
| CA | 2791436 A1 | 4/2014 |
| CN | 108550141 A | 9/2018 |

(Continued)

OTHER PUBLICATIONS

German Search Report issued in application No. 102023132671.6 dated Jul. 4, 2024, 10 pages.

(Continued)

*Primary Examiner* — Tamara L Weber
(74) *Attorney, Agent, or Firm* — Christopher J. Volkmann; KELLY, HOLT & CHRISTENSON PLLC

(57) ABSTRACT

The internal geometry of a haulage vehicle is identified. A material transfer operation is controlled to transfer material from a material transfer vehicle to the haulage vehicle based on the internal geometry of the haulage vehicle.

20 Claims, 26 Drawing Sheets

(56) References Cited

U.S. PATENT DOCUMENTS

| | | |
|---|---|---|
| 9,187,259 B2 | 11/2015 | Van Mill et al. |
| 9,272,853 B2 | 3/2016 | Van Mill et al. |
| 9,392,746 B2 | 7/2016 | Darr et al. |
| 9,457,971 B2 | 10/2016 | Bonefas et al. |
| 9,529,364 B2 | 12/2016 | Foster et al. |
| 9,545,048 B2 | 1/2017 | Pickett et al. |
| 9,596,805 B2 | 3/2017 | Van Mill et al. |
| 9,596,809 B2 | 3/2017 | Van Mill et al. |
| 9,615,509 B2 | 4/2017 | Flickinger et al. |
| 9,642,305 B2 | 5/2017 | Nykamp et al. |
| 9,763,389 B2 | 9/2017 | Bump et al. |
| 9,820,436 B2 | 11/2017 | Inoue et al. |
| 9,861,040 B2 | 1/2018 | Bonefas |
| 9,873,570 B2 | 1/2018 | Van Mill et al. |
| 9,992,931 B2 | 6/2018 | Bonefas et al. |
| 10,019,790 B2 | 7/2018 | Bonefas et al. |
| 10,028,434 B2 | 7/2018 | Van Mill et al. |
| 10,028,441 B2 | 7/2018 | Van Mill et al. |
| 10,028,442 B1 | 7/2018 | Crosby |
| 10,106,333 B2 | 10/2018 | Beaujot et al. |
| 10,278,328 B2 | 5/2019 | Thomson et al. |
| 10,292,327 B2 | 5/2019 | Ducroquet et al. |
| 10,351,364 B2 | 7/2019 | Green et al. |
| 10,406,961 B2 | 9/2019 | Grodecki et al. |
| 10,760,946 B2 | 9/2020 | Meier et al. |
| 10,765,063 B2 | 9/2020 | Van Mill et al. |
| 10,807,812 B2 | 10/2020 | Thomson et al. |
| 11,008,177 B2 | 5/2021 | Banthia et al. |
| 11,457,562 B2 | 10/2022 | Van Mill et al. |
| 11,825,765 B2 | 11/2023 | Van Mill et al. |
| 2009/0321154 A1 | 12/2009 | Johnson |
| 2011/0066337 A1* | 3/2011 | Kormann ............ A01D 43/087 701/50 |
| 2011/0220677 A1 | 9/2011 | Bertolani |
| 2012/0215394 A1 | 8/2012 | Wang et al. |
| 2014/0224377 A1 | 8/2014 | Bonefas |
| 2015/0149048 A1 | 5/2015 | Menke et al. |
| 2015/0264866 A1 | 9/2015 | Foster et al. |
| 2017/0042088 A1 | 2/2017 | Nykamp et al. |
| 2017/0055446 A1 | 3/2017 | Nykamp et al. |
| 2020/0039306 A1 | 2/2020 | Rogan |
| 2020/0319655 A1 | 10/2020 | Desai et al. |
| 2021/0195840 A1 | 7/2021 | Puryk et al. |
| 2021/0294337 A1 | 9/2021 | Van Mill et al. |
| 2021/0329840 A1 | 10/2021 | Craig |
| 2021/0337729 A1 | 11/2021 | O'Connor et al. |
| 2022/0015288 A1 | 1/2022 | Christiansen et al. |
| 2022/0019239 A1 | 1/2022 | Christiansen et al. |
| 2022/0071078 A1 | 3/2022 | Boyer et al. |
| 2022/0287239 A1 | 9/2022 | Faust et al. |
| 2022/0408641 A1 | 12/2022 | Van Mill et al. |
| 2022/0410704 A1 | 12/2022 | O'Connor et al. |

FOREIGN PATENT DOCUMENTS

| | | |
|---|---|---|
| DE | 102009027245 A1 | 12/2010 |
| DE | 102012211001 A1 | 1/2014 |
| DE | 102015109799 A1 | 12/2016 |
| DE | 102016214320 A1 | 2/2017 |
| EP | 1219153 A2 | 7/2002 |
| EP | 2044826 A2 | 4/2009 |
| EP | 2245917 A2 | 11/2010 |
| EP | 2995191 A1 | 3/2016 |
| EP | 3316218 A1 | 5/2018 |
| EP | 3815486 A1 | 5/2021 |
| EP | 3949714 A1 | 2/2022 |
| EP | 3955183 A1 | 2/2022 |
| EP | 4056019 A1 | 9/2022 |
| EP | 4062740 A1 | 9/2022 |
| EP | 4070636 A1 | 10/2022 |
| EP | 4101286 A1 | 12/2022 |
| GB | 1104906 A | 3/1968 |
| WO | 2018102524 A1 | 6/2018 |
| WO | 2022036114 A1 | 2/2022 |
| WO | 2023150219 A1 | 8/2023 |

OTHER PUBLICATIONS

1950 Dual Auger Grain Cart—Killbros Farm Equipment, retrieved from https://web.archive.org/web/20160203214035/ https://www.killbrosequip.com/grain-carts/1950/, 2016, 8 pages.

Application and Drawings for U.S. Appl. No. 18/334,861, dated Jun. 14, 2023, 96 Pages.

Application and Drawings for U.S. Appl. No. 18/334,863, dated Jun. 14, 2023, 73 Pages.

Application and Drawings for U.S. Appl. No. 18/334,869, dated Jun. 14, 2023, 85 Pages.

Application and Drawings for U.S. Appl. No. 18/334,874, dated Jun. 14, 2023, 59 Pages.

Application and Drawings for U.S. Appl. No. 18/334,886, dated Jun. 14, 2023, 47 Pages.

Application and Drawings for U.S. Appl. No. 18/352,576, dated Jul. 14, 2023, 39 Pages.

Application and Drawings for U.S. Appl. No. 18/358,401, dated Jul. 25, 2023, 47 Pages.

Application and Drawings for U.S. Appl. No. 18/447,718, dated Aug. 10, 2023, 53 Pages.

Application and Drawings for U.S. Appl. No. 18/465,580, dated Sep. 12, 2023, 114 Pages.

Application and Drawings for U.S. Appl. No. 18/471,701, dated Sep. 21, 2023, 50 Pages.

Application and Drawings for U.S. Appl. No. 63/381,178, dated Oct. 27, 2022, 101 Pages.

Application and Drawings for U.S. Appl. No. 63/381,187, dated Oct. 27, 2022, 104 Pages.

Application and Drawings for U.S. Appl. No. 63/512,368, dated Jul. 7, 2023, 101 Pages.

Autodesk: "Determine Volume of Solid," Oct. 16, 2019, 03 Pages, Retrieved from URL: https://knowledge.autodesk.com/support/autocad/learn-explore/caas/sfdcarticles/sfdcarticles/Determine-volume-of-solid.html#:~:text=To%20determine%20the%20volume%20of%20a%20solid%20object%2C%20use%20the,Press%20ENTER.

Extended European Search Report for European Application No. 23202466.1, dated Mar. 26, 2024, 7 Pages.

Extended European Search Report for European Application No. 23202485.1, dated Mar. 26, 2024, 07 Pages.

Extended European Search Report for European Application No. 23202510.6, dated Apr. 4, 2024, 10 Pages.

Extended European Search Report for European Application No. 23202817.5, dated Apr. 23, 2024, 08 Pages.

Extended European Search Report for European Application No. 23202822.5, dated Mar. 19, 2024, 07 Pages.

Extended European Search Report for European Application No. 23203067.6, dated Mar. 26, 2024, 11 Pages.

Extended European Search Report for European Application No. 23203069.2, dated Mar. 18, 2024, 07 Pages.

Extended European Search Report for European Application No. 23203519.6, dated Mar. 14, 2024, 05 Pages.

Extended European Search Report for European Application No. 23203536.0, dated Mar. 14, 2024, 06 Pages.

Extended European Search Report for European Application No. 23203537.8, dated Mar. 14, 2024, 05 Pages.

Huang X., et al., "A Comprehensive Survey on Point Cloud Registration," Researchgate, 2021, pp. 1-17, (Mar. 5, 2021), Retrieved from URL: https://www.researchgate.net/pubiication/349787695_A_comprehensive_survey_on_point_cloud_registraion.

John Deere: "Active Fill Control," 2 Pages, [Retrieved on Jun. 27, 2023] Retrieved from URL: https://www.deere.com/en/technology-products/precision-ag-technologyiguidance/active-fill-control/.

John Deere: "Machine Sync," 3 Pages, [Retrieved on Jun. 27, 2023] Retrieved from URL: https://www.deere.com/en/technology-products/precision-ag-technologyiguidance/machine-sync/.

(56) References Cited

OTHER PUBLICATIONS

Stanley N., "Solidworks Calculating Volume of a Solid," GoEngineer, Feb. 3, 2022, 6 Pages, Retrieved from URL: https://www.goengineer.com/blog/solidworks-calculating-volume-of-a-solid.

Tesla Motors Club: "Lane Change Notification," Dec. 29, 2021, 4 Pages, Retrieved from URL: https://teslamotorsclub.com/tmc/threads/lane-change-notification.252072/.

Tumenjargal E., et al., "Development of ISO 11783 Compliant Agricultural Systems: Experience Report," Automotive Systems and Software Engineering, 2019, pp. 197-223.

* cited by examiner

CONTROLLING TRANSFER OF MATERIAL FROM A TRANSFER VEHICLE TO A HAULAGE VEHICLE BASED ON AN INTERNAL PROFILE OF THE HAULAGE VEHICLE

CROSS-REFERENCE TO RELATED APPLICATION

The present application is a continuation-in-part of and claims the benefit of the priority of U.S. patent application Ser. No. 18/465,580, filed Sep. 12, 2023, and claims the benefit of the priority of U.S. provisional patent application Ser. No. 63/512,368, filed Jul. 7, 2023, U.S. provisional patent application Ser. No. 63/381,178, filed Oct. 27, 2022, and U.S. provisional patent application Ser. No. 63/381,187, filed Oct. 27, 2022, the content of which is hereby incorporated by reference in its entirety.

FIELD OF THE DESCRIPTION

The present description relates to transferring material. More specifically, the present description relates to transferring harvested material from a transfer vehicle to a haulage vehicle.

BACKGROUND

There is a wide variety of different types of agricultural systems. Some systems include a harvester that harvests material from a field and a transfer vehicle (such as a tractor towing a grain cart) that transfers the harvested material from the harvester to a haulage vehicle. The transfer vehicle is loaded with material from the harvester. The transfer vehicle then drives to a haulage vehicle to transfer the material from the location of the harvester to the location of the haulage vehicle and to then transfer the material out of the material transfer vehicle and into to the haulage vehicle. The haulage vehicle removes the material from the operation site (e.g., from the field). The haulage vehicle is often a semi-trailer that is pulled by a semi-tractor or a grain truck or cargo truck the takes harvested material to a storage location or a processing facility.

In many harvesting operations, it is common for a harvester to be working in a field or other harvesting operation site. The transfer vehicle often approaches the harvester when the harvester is nearing its capacity of harvested material, and the harvester unloads the harvested material into the transfer vehicle.

More specifically, the unloading operation can sometimes take place while the harvester is operating so that the transfer vehicle runs alongside, or behind, the harvester as the harvester is unloading material into the transfer vehicle. The harvester simultaneously loads harvested material into the material transfer vehicle. Once the material transfer vehicle is full, the material transfer vehicle often travels to a material transfer site to transfer the material into the haulage vehicle. For instance, it is not uncommon for a semi-trailer to pull into a field or onto the shoulder of a road adjacent a harvesting operation site (such as a field or near a group of fields). The transfer vehicle then pulls up adjacent the semi-trailer and unloads material from the transfer vehicle to the haulage vehicle.

As an example, where the transfer vehicle is a tractor-pulled grain cart, and where the haulage vehicle is a semi-trailer, then the tractor positions itself so that the cart is adjacent the semi-trailer. A spout (with an auger or another conveyance subsystem) is then positioned so that the conveyance subsystem can transfer material from the cart to the semi-trailer through the spout. The auger or other conveyance subsystem is then actuated to transfer the material from the grain cart to the semi-trailer to unload the grain cart. Once unloaded, the grain cart is then free to travel back to the harvester to receive more material from the harvester.

The discussion above is merely provided for general background information and is not intended to be used as an aid in determining the scope of the claimed subject matter.

SUMMARY

An internal geometry of a haulage vehicle is identified. A material transfer operation is controlled to transfer material from a material transfer vehicle to the haulage vehicle based on the internal geometry of the haulage vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
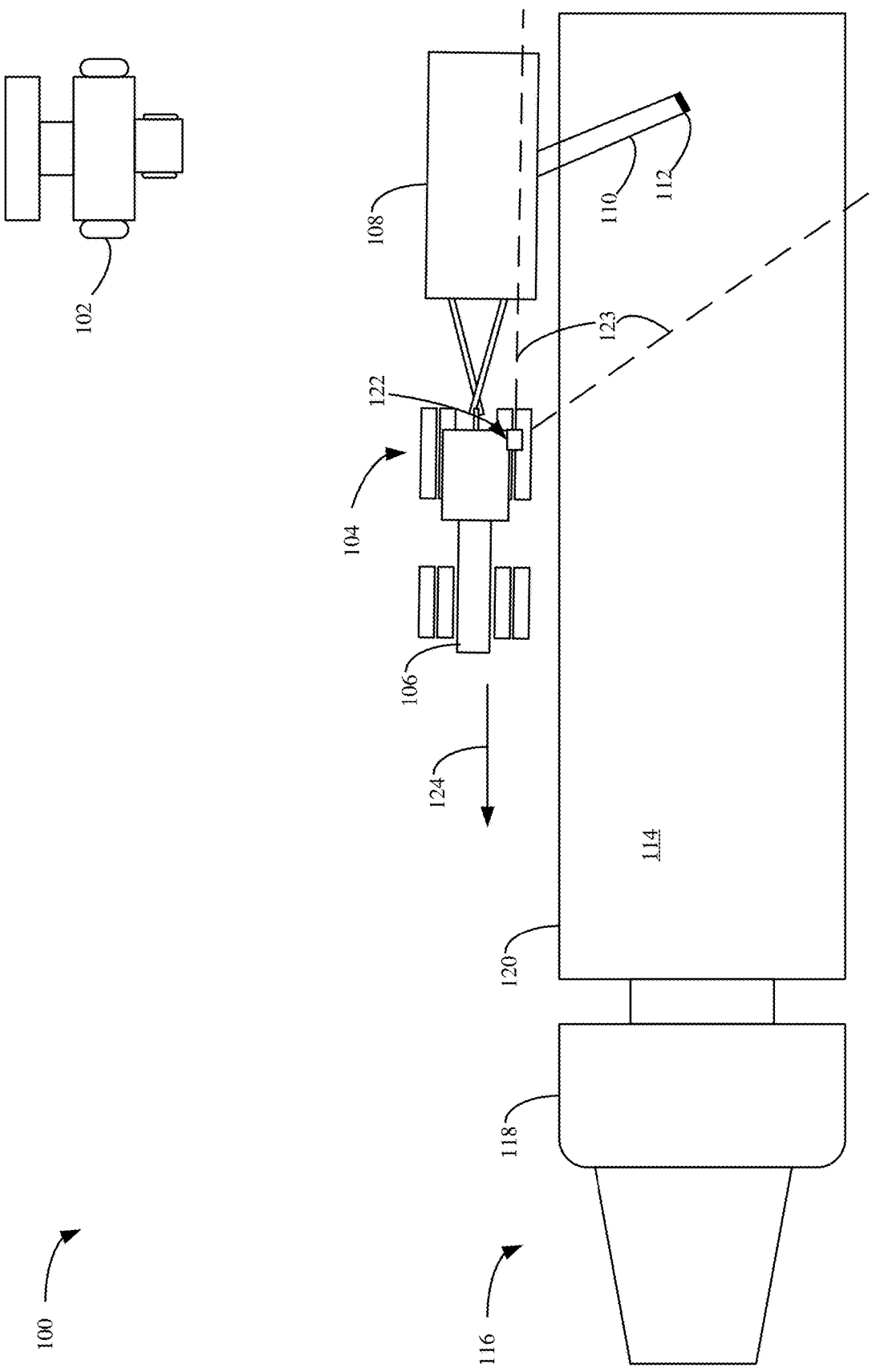
FIG. 1 is a pictorial illustration of a material transfer vehicle in a first position relative to a haulage vehicle.

As discussed above, it is common during a harvesting operation for a material transfer vehicle (such as a tractor pulling a grain cart) to transfer material from a harvester that is harvesting in a field to a haulage vehicle which hauls the harvested material away from the field or other harvesting operation site (e.g., the harvesting operation site may include multiple different fields in close proximity with one another). The operator of the tractor must align the grain cart with the haulage vehicle (which is often a semi-trailer or a cargo truck) correctly and unload the grain without any spillage. This can be a very tedious task and can also be very difficult and error prone. The operator must normally, at the same time, control the position of the grain cart relative to the semi-trailer or cargo truck, as well as the position of the spout (and flap where a flap is used) to control the landing point of the harvested material within the haulage vehicle. These things must often all be controlled simultaneously in order to successfully unload the harvested material into the haulage vehicle. Similarly, the operator must normally monitor the level of material in the haulage vehicle to obtain an even fill of material in the haulage vehicle.

The difficulties can be exacerbated because the transfer of material to the haulage vehicle is often done at a high rate of speed, which increases the amount of dust or other obscurants, making vision difficult. Also, the walls or sides of the haulage vehicle may be very tall, making it difficult to observe the transfer operation.

Some systems have been developed to assist in the part of the harvesting operation where harvested material is unloaded from a harvester into the material transfer vehicle. For example, some automatic cart filling control systems have been developed to automate portions of the filling process used to fill a receiving vehicle (also called a material transfer vehicle or transfer vehicle, such as a tractor pulling a grain cart) with material from a harvester. One such automatic fill control system uses a stereo camera on the spout of the harvester to capture an image of the receiving vehicle. An image processing system determines dimensions of the receiving vehicle and the distribution of crop deposited inside the receiving vehicle. The system also detects material height within the receiving vehicle, in order to automatically aim the spout toward empty spots and control the flap position (and thus material trajectory) to achieve a more even fill, while reducing spillage. Such systems can fill the receiving vehicle according to a fill strategy (such as front-to-back, back-to-front, etc.) that is set by the operator or that is set in other ways.

In addition, some current harvesters are provided with a machine synchronization control system. The harvester may be a combine harvester so that the spout is not movable relative to the frame during normal unloading operations. Instead, the relative position of the receiving vehicle and the combine harvester is changed in order to fill the receiving vehicle as desired. Thus, in a front-to-back fill strategy, for instance, the relative position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level. In that case, the machine synchronization system on the combine harvester can send a "nudge" signal to the machine synchronization system on the towing vehicle. The "nudge", once received by the machine synchronization system on the towing vehicle, causes the towing vehicle to momentarily speed up or slow down, thus nudging the position of the receiving vehicle forward or rearward, respectively, relative to the combine harvester.

As discussed above, the operation of transferring material from the material transfer vehicle to the haulage vehicle (e.g., from a grain cart to a semi trailer) can present additional challenges. The internal geometry of the haulage vehicle may not be known and observation may be difficult due to obscurants, the high ends or walls of the haulage vehicle, etc.

The present description thus describes a system which includes a control system that has access to a plurality of different haulage vehicle internal geometries, each corresponding to a different haulage vehicle. The internal geometries are used to automatically control the material transfer operation that transfers material from the material transfer vehicle to the haulage vehicle.

As one example, the present description proceeds with respect to a system that controls the transfer of material from a material transfer vehicle to a haulage vehicle (e.g., from a grain cart to a semi-trailer) based on a volume profile of the haulage vehicle. However, the volume of a haulage vehicle may be difficult to obtain without manual measurement. In one example of the present description, a computer aided design (CAD) file corresponding to the haulage vehicle is accessed. A volume profile of the haulage vehicle is then identified based on the CAD file. The volume profile can then be used to control the unloading operation.

The internal geometry of the haulage vehicle may be ingested (or accessed) in other ways as well. For instance, a set of sensors can be mounted on the transfer vehicle (e.g., on the tractor or on a grain cart that is being towed by the tractor, or elsewhere). The sensors can be hand held sensors, sensors mounted on an unmanned aerial vehicle, etc. The sensors can be used to scan the haulage vehicle to generate a representation of the internal geometry of the haulage vehicle.

In another example, an operator input can be provided to identify a relatively simple, two-dimension profile of the haulage vehicle, as well as a measurement indicative of the width and/or height and/or length of the haulage vehicle. The internal profile of the haulage vehicle can be generated based upon the operator inputs.

In yet another example, an internal profile corresponding to a plurality of different types of haulage vehicle can be stored. Then, when the transfer vehicle approaches the haulage vehicle, the type of haulage vehicle can be identified and its corresponding internal profile can be accessed for use in controlling the material transfer operation that transfers the material from the material transfer vehicle to the haulage vehicle. In various examples, the type of haulage vehicle can be detected by a sensor, identified by a user through a user input, transmitted to a control system by the haulage vehicle, itself, or identified in other ways.

FIG. 1 is a pictorial illustration of one example of an agricultural system 100 in which a harvester 102 (e.g., a combine harvester) is harvesting material from a field. A material transfer vehicle (or transfer vehicle) 104 includes a propulsion vehicle (or tractor) 106 that is providing propulsion to (e.g., towing) a grain cart 108. The grain cart 108 illustratively has a spout 110 that includes an auger that transfers material from the grain cart 108 up through spout 110 and out an outlet end 112 of spout 110 into a receiving area 114 of a haulage vehicle 116. Spout 110 may have a flap mounted on the distal end or the outlet end 112 to control the trajectory of material exiting spout 110. In the example shown in FIG. 1, haulage vehicle 116 includes a semi-truck that has a semi-tractor 118 coupled to a semi-trailer 120.

In operation, grain cart 108 of transfer vehicle 104 may receive harvested material from harvester 102 while harvester 102 is harvesting in the field, or while harvester 102 is stationary. When grain cart 108 is filled, (or when the harvester 102 is unloaded) transfer vehicle 104 moves into position adjacent haulage vehicle 116 so that the spout 110 can be positioned over the receiving area 114 of haulage vehicle 116 in order to transfer material from grain cart 108 to receiving area 114 of haulage vehicle 116.

In one example, transfer vehicle 104 has a haulage vehicle sensor 122 which may be a stereo camera that has a field of view indicated by dashed lines 123 or another sensor that senses haulage vehicle 116. For instance, sensor 122 can be a stereo camera which captures one or more images of hauling vehicle 116, along with an image processing system that processes the images to identify parts of haulage vehicle 116 (e.g., the edges or bounds of receiving area 114). The part of haulage vehicle 116 that is identified in the images captured by sensor 122 can then be localized to a coordinate system corresponding to material transfer vehicle 104 so that the location of receiving area 114 (and the edges or bounds of receiving area 114) can be identified relative to the location of the outlet end 112 of spout 110. Based upon the location of outlet end 112 of spout 110 relative to receiving area 114, a control system on material transfer vehicle 104 (or elsewhere) can then control the steering and propulsion subsystems of tractor 106 in order to automatically move material transfer vehicle 104 into a desired location relative to haulage vehicle 116 so that the harvested material in grain cart 108 can be unloaded into receiving area 114 of haulage vehicle 116.

Also, in one example, the control system includes an internal geometry ingestion system for accessing an internal geometry of haulage vehicle 116 and a transfer strategy execution system that detects or estimates the fill level of material in receiving area 114 at the landing point where material is landing in receiving area 114, as the material is unloaded through spout 110.

During automatic unloading from material transfer vehicle 104 into haulage vehicle 116, a sensor-based processor can detect the top of the haulage vehicle 116 and estimate a fill level based upon the detected top of the haulage vehicle 116. Another system may determine the fill level of the haulage vehicle 116 based upon the measured or estimated weight of material transferred to the haulage vehicle 116, and/or the volume of the material transferred to the haulage vehicle 116, etc. In these types of systems, fill estimation algorithms may have difficulty in estimating the fill level of the haulage vehicle 116 because the volume of the haulage vehicle 116, and the volume profile of the haulage vehicle 116, may be unknown. Some haulage vehicles 116 may have oblique or slanted sides so that simple measurements of the haulage vehicle 116 are difficult to obtain and normally cannot be used to discern the volume profile of the haulage vehicle 116. This makes it difficult to estimate the volume of material in the haulage vehicle 116. Such a problem is exacerbated where the volume of material in the haulage vehicle 116 is estimated based upon an optically captured image of the haulage vehicle 116 due to the high levels of dust or other obscurants. Thus, the fill control can use a sensor system, operator inputs, a vehicle type, or a CAD file, or other inputs, to detect the internal geometry of the haulage vehicle 116. The internal geometry can then be used to estimate the fill level, or detect the fill level in haulage vehicle 116.

When the material level is within a threshold value of a desired fill level (or when the transferred volume is within a threshold value of the desired volume), then the fill control system can generate control signals to automatically move material transfer vehicle 104, such as in the direction indicated by arrow 124. In one example, material transfer vehicle 104 is moved so that the landing point of material exiting spout 110 is at a new location within receiving area 114 of haulage vehicle 116 so that the receiving area 114 of haulage vehicle 116 can be evenly filled with harvested material.

Also, in one example, where receiving area 114 is already partially filled when material transfer vehicle 104 approaches haulage vehicle 116, then the control system processes the internal geometry of haulage vehicle 116 and/or the images captured by sensor 122 to identify an initial landing point within receiving area 114 that is not already full. The control system can control material transfer vehicle 104 to move to a location such that the outlet end 112 of spout 110 is positioned to transfer material to the initial landing point.

Figure 2:
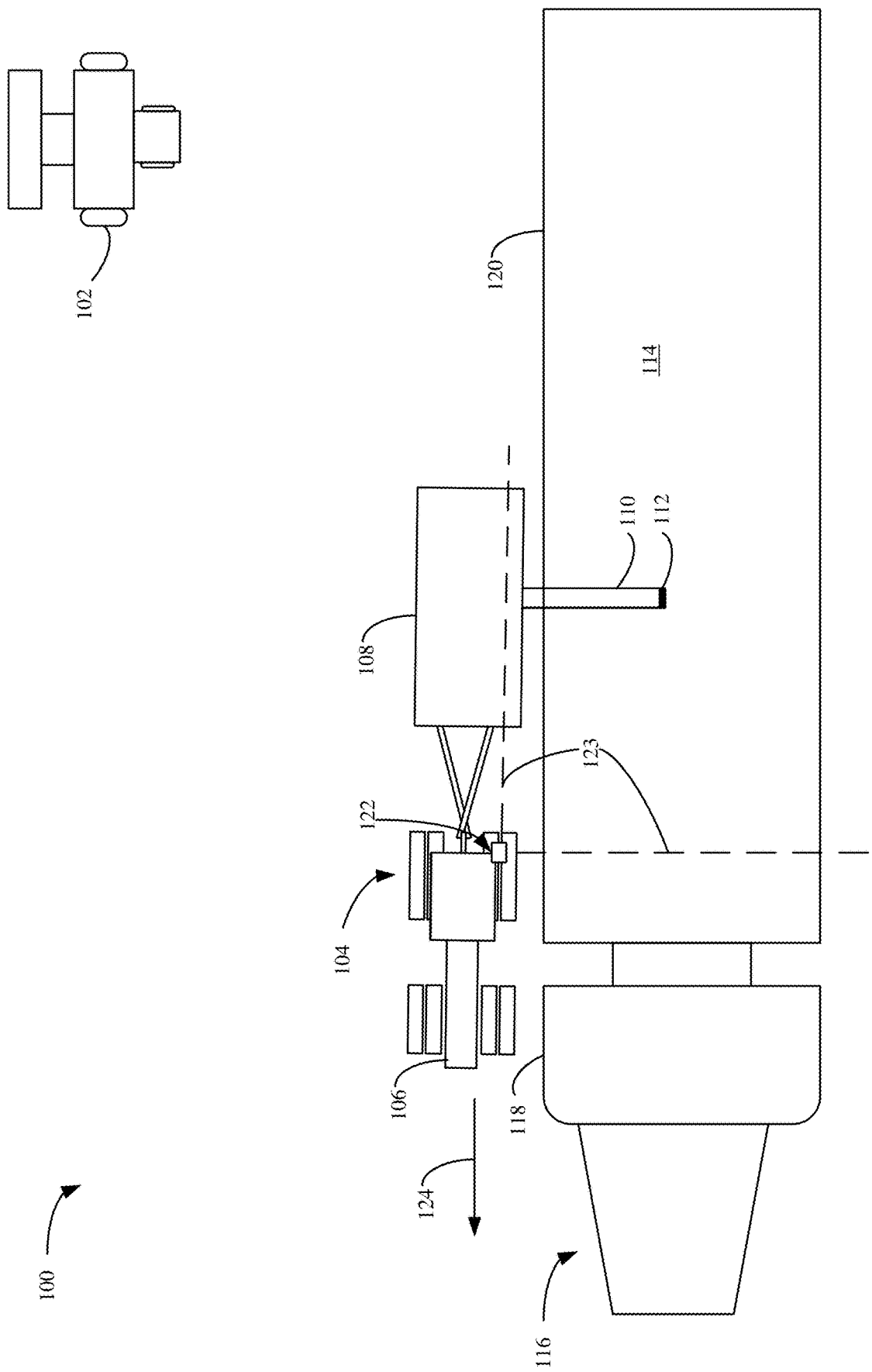
FIG. 2 is a pictorial illustration showing a material transfer vehicle in a second position relative to a haulage vehicle.
Figure 3:
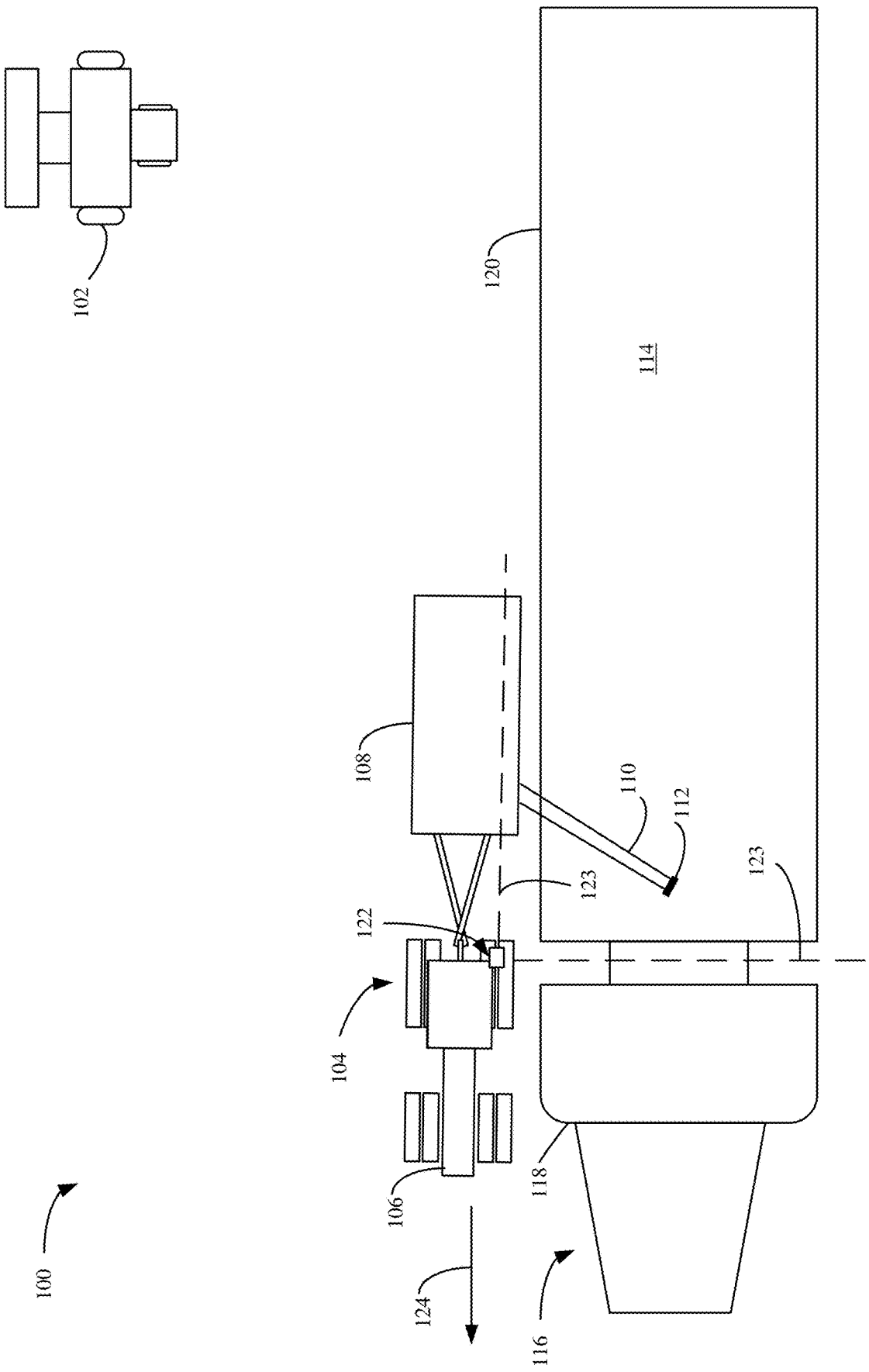
FIG. 3 is a pictorial illustration showing a material transfer vehicle in yet another position with respect to a haulage vehicle.

FIG. 2 is similar to FIG. 1, and similar items are similarly numbered. However, it can be seen in FIG. 2 that material transfer vehicle 104 has moved to a new location relative to haulage vehicle 116 so that the landing point of material from grain cart 108 is now in a more central location within receiving area 114 than it was in FIG. 1. FIG. 3 is similar to FIG. 4, and similar items are similarly numbered. However, it can be seen in FIG. 3 that material transfer vehicle 104 has been moved further forward in the direction indicated by arrow 124 so that the landing point of material exiting spout 110 is now at a forward location in receiving area 114. It will be noted, of course, that material transfer vehicle 104 can also approach haulage vehicle 116 in the opposite direction to that shown in FIGS. 1-3 or on the opposite side of receiving area 114 so that material transfer vehicle 104 can begin loading haulage vehicle 116 at a forward end of receiving area 114, or in a central area of receiving area 114, or at a different location. The positions of transfer vehicle 104 shown in FIGS. 1-3 are shown for the sake of example only.

Also, it will be noted that the control system can identify the forward and rearward edges (or walls), as well as the side edges (or walls), of receiving area 114. In one example, the control system enforces a boundary that is offset inwardly into receiving area 114 from the edges or walls of receiving area 114 so that the landing point of material does not cross the boundary. This can be done in order to reduce the likelihood of accidental spillage of harvested material over the edges or walls of receiving area 114.

Figure 4:
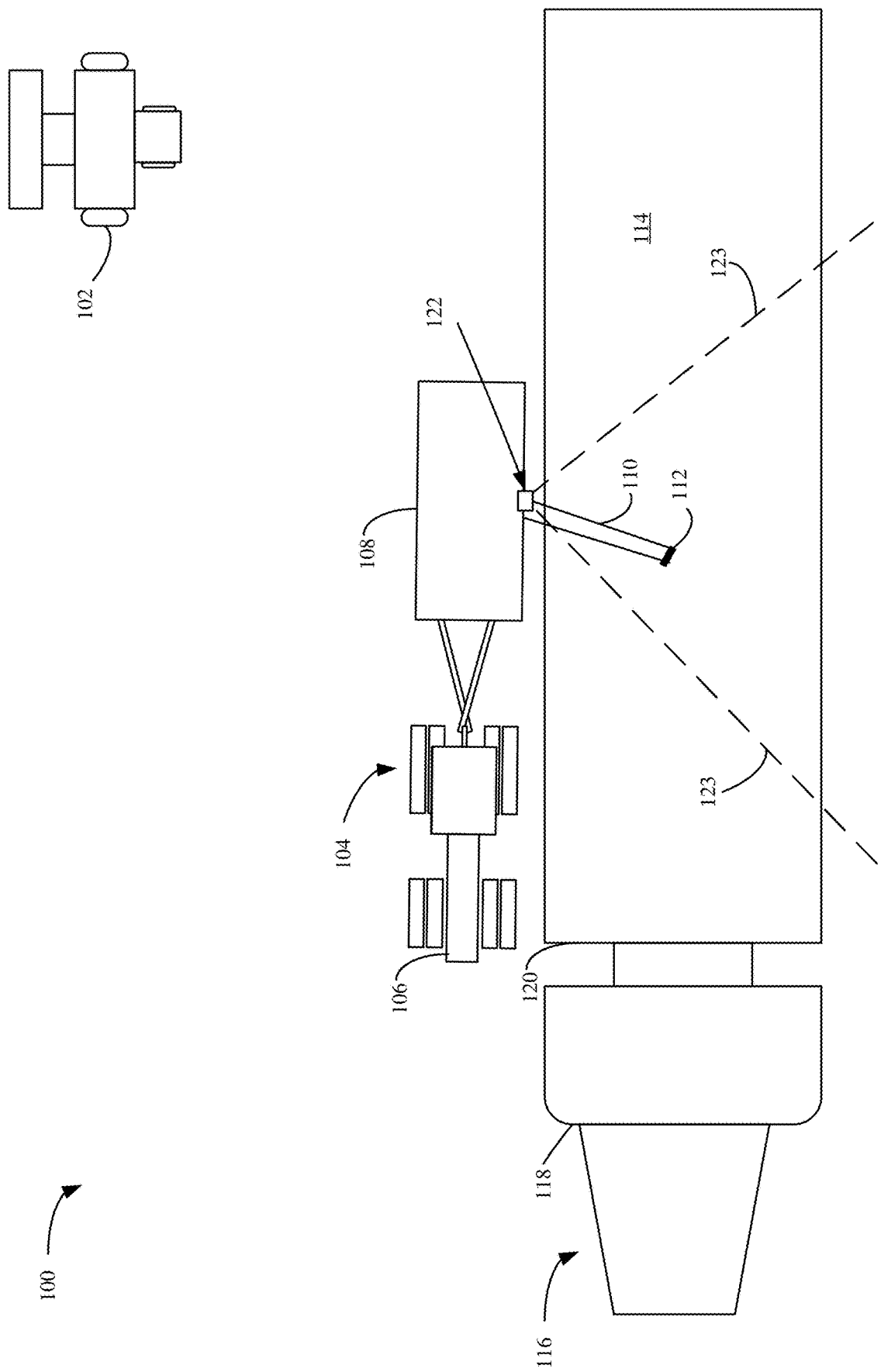
FIG. 4 is a pictorial illustration of a material transfer vehicle with an optical sensor deployed on a grain cart.

FIG. 4 is similar to FIG. 2, and similar items are similarly numbered. However, in FIG. 4 it can be seen that sensor 122 is now mounted on grain cart 108, instead of on tractor 106. In one example, sensor 122 is mounted on an extension arm which raises sensor 122 above the edges or walls of receiving area 114 to a sufficient elevation that the field of view 123 of sensor 122 can capture a portion of receiving area 114 and so that image processing can be used to identify the edges or walls of receiving area 114 proximate the landing point of material exiting spout 110.

Figure 5:
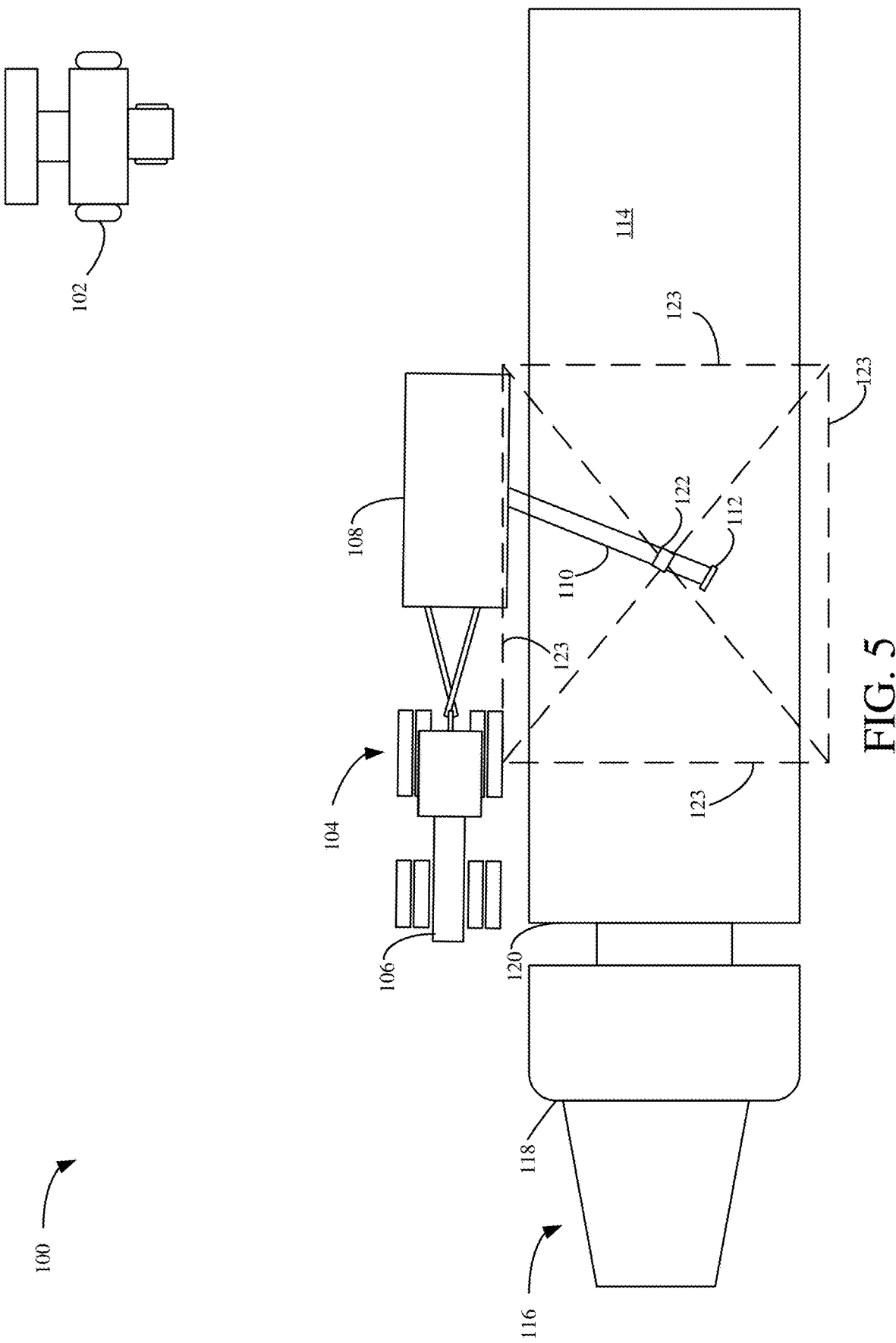
FIG. 5 is a pictorial illustration of a material transfer vehicle and a haulage vehicle with an optical sensor deployed on a spout of the material transfer vehicle.

FIG. 5 is similar to FIG. 4 except that FIG. 5 shows that sensor 122 is now mounted on spout 110. Thus, the field of view 123 of sensor 122 is directed more downwardly onto receiving area 114 so that the edges or walls of receiving area 114 proximate the landing point of material exiting spout 110 can be identified in the captured images. It will be noted that sensor 122 can be mounted in other locations as well and those locations shown in FIGS. 1-5 are shown for the sake of example only.

Also, the location and orientation of sensor 122 on transfer vehicle 104 is illustratively known so that the location of the edges or walls of receiving area 114 in the captured images can be localized to (or located relative to) sensor 122 and then to other parts of material transfer vehicle 104 so that material transfer vehicle 104 can be guided into a desired location relative to haulage vehicle 116 to perform the desired material transfer operation.

Figure 6A:
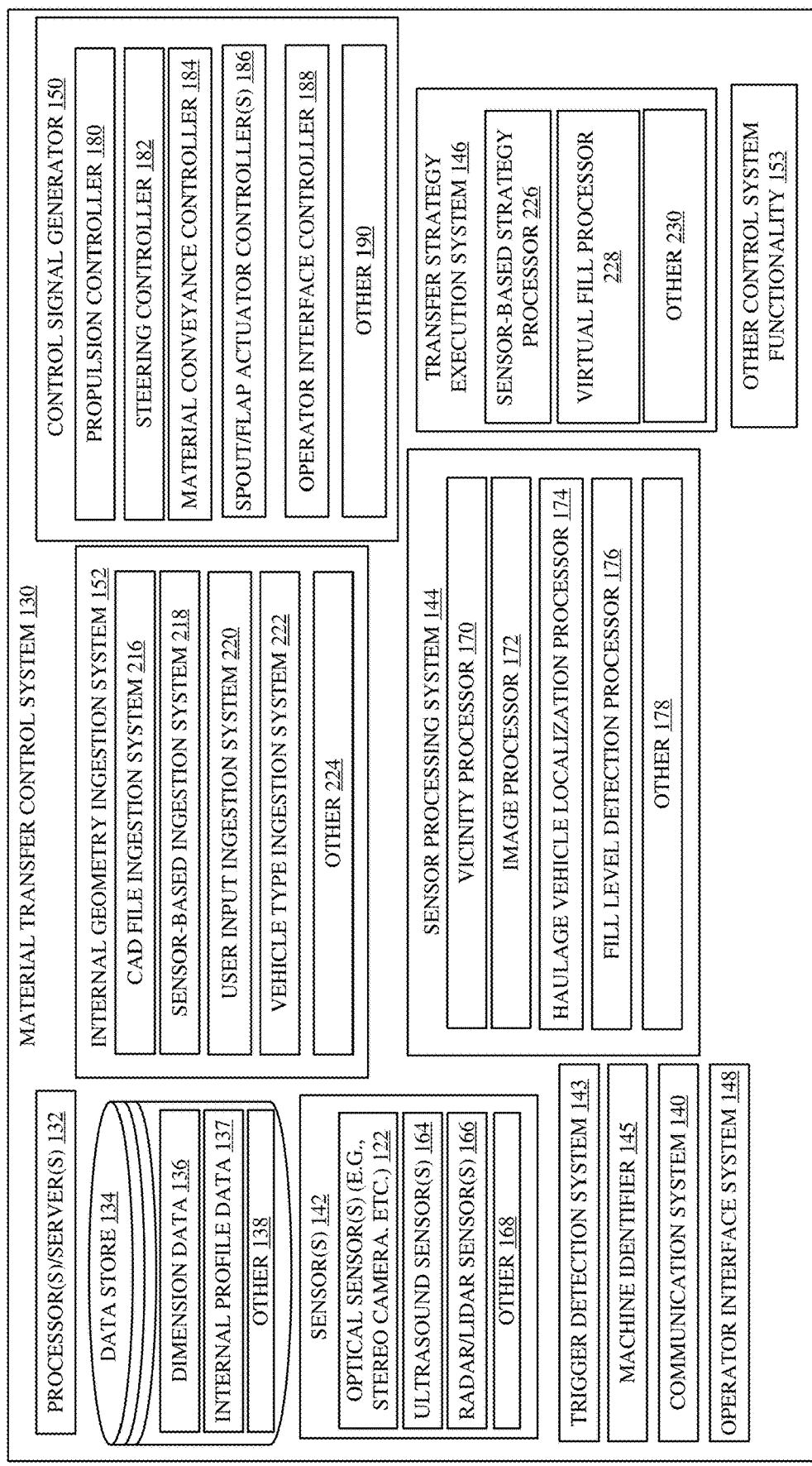
FIGS. 6A and 6B (collectively referred to herein as FIG. 6) show a block diagram showing one example of an agricultural system.
Figure 6B:
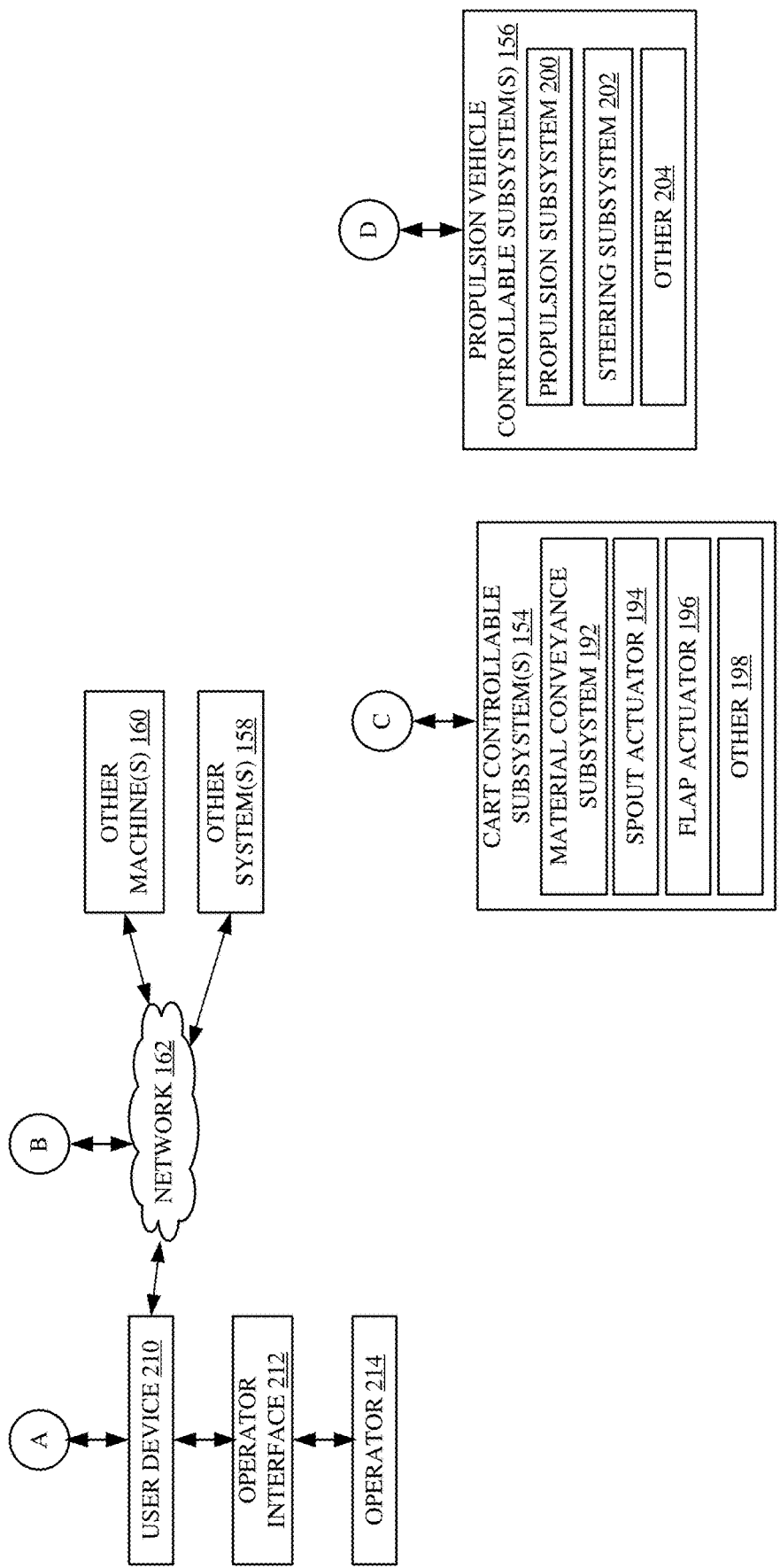

FIG. 6 is a block diagram of one example of a material transfer control system 130 that can be used in the agricultural system 100 shown in FIGS. 1-5. FIG. 6 shows that material transfer control system 130 can be connected to one or more cart controllable subsystems 154 on grain cart 108 and/or to propulsion vehicle controllable subsystems 156 on tractor 106. Material transfer control system 130 can also be coupled to other systems 158 and other machines 160 over a network 162. The other systems 158 can be farm manager systems, vendor systems, systems in other vehicles, etc. Other machines 160 can include harvester 102, other tender vehicles, other haulage or material transfer vehicles, etc. Network 162 can thus include a wide area network, a local area network, a near field communication network, a wifi or Bluetooth network, a cellular communication network, or any of a wide variety of other networks or combinations of networks. Also, while material transfer control system 130 is shown communicating directly with cart controllable subsystems 154 and propulsion vehicle controllable subsystems 156, that communication can also be over network 162 or accomplished in other ways.

It will be noted that the items in material transfer control system 130 can all be located on tractor 106 or on grain cart 108, or the items can be disbursed at different locations or in a remote server environment or other locations accessible by agricultural system 100. In the example shown in FIG. 6, material transfer control system 130 includes one or more processors or servers 132, data store 134 (which can include dimension data 136, internal profile data 137, and other data 138), communication system 140, sensors 142, trigger detection system 143, sensor processing system 144, machine identifier 145, transfer strategy execution system 146, operator interface system 148, control signal generator 150, internal profile ingestion system 152, and other control system functionality 153.

FIG. 6 also shows that a user device 210 can be coupled to control system 130 directly or through network 162. User device 210 can generate operator interface 212 for interactions by operator 214. Operator 214 can control and manipulate device 210 and some portions of system 130 by interacting with operator interface 212.

Sensors 142 can include one or more optical sensors 122 (such as a stereo camera, etc.), ultrasound sensors 164, RADAR and/or LIDAR sensors 166, and any of a wide variety of other sensors 168. Sensor processing system 144 can include vicinity processor 170, image processor 172, haulage vehicle localization processor 174, fill level detection processor 176, and other items 178. Control signal generator 150 can include propulsion controller 180, steering controller 182, material conveyance controller 184, spout/flap actuator controller(s) 186, operator interface controller 188, and other items 190.

Internal geometry ingestion system 152 can include CAD file ingestion system 216, sensor-based ingestion system 218, user input ingestion system 220, vehicle type ingestion system 222, and other items 224. Transfer strategy execution system 146 can include sensor-based strategy processor 226, virtual fill processor 228, and other items 230.

Cart controllable subsystems 154 can include a material conveyance subsystem 192 which may include one or more augers or other conveyers, spout actuator 194, flap actuator 196, and/or other subsystems 198. Propulsion vehicle controllable subsystems 156 can include propulsion subsystem 200, steering subsystem 202, and other items 204. Before describing the overall operation of material transfer control system 130 in more detail, a description of some of the items in material transfer control system 130, and their operation, will first be provided.

Trigger detection system 143 detects a trigger criterion indicating that material transfer control system 130 is to take over automated control of material transfer vehicle 104 to transfer material to haulage vehicle 116. The trigger criterion may indicate that material transfer vehicle 104 is approaching, and within a threshold proximity of, haulage vehicle 116. The trigger criterion may be based on an operator input indicating that system 130 should take over automated control, or any of a variety of other criterion.

Dimension data 136 may include the dimensions of haulage vehicle 116, such as the dimensions of receiving area 114, and other dimensions. Thus, by capturing an image of a portion of receiving area 114 and identifying, for example, one edge of receiving area 114, then the location of the opposite edge can also be estimated using the dimension data 136. This is just one example of the dimension data 136 that can be used.

Internal profile data 137 can be data that identifies the internal geometry, the volume profile, or other internal geometry of haulage vehicle 116 (e.g., semi trailer 120). Data 137 can be indexed by a vehicle identifier, by vehicle type, etc.

One example of optical sensor 122 was discussed elsewhere and can include, for example, a stereo camera or other optical sensor. Ultrasound sensors 164 can be used in addition to, or instead of, optical sensors 122. Ultrasound sensors 164 may be used on tractor 106, for instance, to scan receiving vehicle 120 or receiving area 114 to identify the internal geometry of receiving vehicle 120, to sense the location of haulage vehicle 116 relative to material transfer vehicle 104, etc. RADAR/LIDAR sensors 166 can be used instead of, or in addition to, other sensors. Sensors 166 can also be used to sense the internal geometry or haulage vehicle 116, or the location of haulage vehicle 116 relative to material transfer vehicle 104, or to sense other items.

Communication system 140 is configured to enable communication of the items of material transfer control system 130 with one another, with other machines 160, other systems 158, and/or with subsystems 154 and 156 and also with other items over network 162. Therefore, communication system 140 can include a controller area network (CAN) bus and bus controller, as well as components that are configured to communicate over network 162 and/or directly with subsystems 154 and 156.

Internal geometry ingestion system 152 can receive information from sensors 142, dimension data 136, CAD files corresponding to trailer 120, user inputs, a vehicle type identification generated by machine identifier 145, and/or other items, and identify the internal geometry of trailer 120 or receiving area 114. For instance, CAD file ingestion system 216 can obtain a trailer identifier identifying trailer 120 and then obtain access to a corresponding CAD file. CAD file ingestion system 216 process the CAD (if needed) file to identify the internal geometry of trailer 120 (or the internal volume profile or other geometry of receiving area 114), based upon the CAD file. Sensor-based ingestion system 218 can receive inputs from sensors 142, as those sensors are positioned to scan the trailer 120 and/or receiving area 114. Based upon the sensor inputs, sensor-based ingestion system 218 can construct or otherwise generate an indication of the internal geometry (e.g., the volume profile) of trailer 120. User input ingestion system 220 can be used to receive a user input that is indicative of a dimensional characteristic of the trailer 120. For instance, user input ingestion system 220 can be used to generate a user interface display which displays a representation of trailer 120, and allows the operator 214 to trace the outline of trailer 120. Based upon the traced outline, and possibly other user inputs such as width, length, and/or height dimensions, user input ingestion system 220 can construct or otherwise generate a representation of the internal geometry of trailer 120. Vehicle type ingestion system 222 can receive an input (an operator input or a sensor input or another input) indicative of the type of trailer 120 (such as whether the trailer is a single hopper trailer, a double hopper trailer, a belt trailer, etc.). Based upon the vehicle type, vehicle type ingestion system 222 can access internal geometry data indicative of the internal geometry of that type of trailer. Internal geometry ingestion system 152 can output a representation of the internal geometry to transfer strategy execution system 146 so that system 146 can execute a material transfer strategy to transfer material from material transfer vehicle 104 to haulage vehicle 116.

Sensor processing system 144 processes the signals received from sensors 142. Vicinity processor 170 can process the sensor signals to identify the locations of haulage vehicle 116 and material transfer vehicle 104 relative to one another. That location can be used, for example, to determine whether material transfer vehicle 104 is in the vicinity of haulage vehicle 116 so that automated control of the propulsion and steering subsystems 200, 202 should commence in order to move material transfer vehicle 104 into a position relative to haulage vehicle 116 to begin unloading material. Image processor 172 can process the images captured by optical sensor 122 to identify items within the captured images, such as the edges of receiving area 114, the level of material within receiving area 114, among other things. Haulage vehicle localization processor 174 localizes the items identified in the images by image processor 172 (or other sensors) to a coordinate system corresponding to material transfer vehicle 104. For instance, by locating the edges of receiving area 114 in a captured image, and by accessing data in data store 134 indicative of the location and orientation of optical sensor 122 on material transfer vehicle 104, the location of those edges can then be located relative to other portions of material transfer vehicle 104, such as relative to the outlet end 112 of spout 110, relative to the edges of grain cart 108 and tractor 106, etc.

Fill level detection processor 176 detects the level of material in receiving area 114 based upon the captured image or based upon other sensor inputs. The fill level can be detected by generating a point cloud based on items in the captured image and processing the point cloud to identify the height of material at each point in the captured image. The fill level can be detected in other ways as well.

Transfer strategy execution system 146 generates outputs to control signal generator 150 to execute a fill strategy. For instance, transfer strategy execution system 146 may be configured or programmed to execute a back-to-front fill strategy. In that case transfer strategy execution system 146 generates outputs to control signal generator 150 so control signal generator 150 generates control signals to automatically move material transfer vehicle 104 to a location so that the landing point of material exiting spout 110 will be at a first location in receiving area 114 (offset from the rear of receiving area 114) that is not yet filled to a desired fill level. Then, based upon the detected or estimated fill level, transfer strategy execution system 146 can activate material conveyance subsystem 192 to fill the location to a desired fill height and/or to a desired weight and/or volume and to then generate outputs to control signal generator 150 so that control signal generator 150 can automatically move material transfer vehicle 104 forward relative to receiving area 114 so that the landing point of material being unloaded from grain cart 108 also moves forward to execute the back-to-front fill strategy. Also, for example, using the internal geometry of receiving area 114, and sensor signals sensing the height and/or weight of material at that location in receiving area 114, then sensor-based strategy processor 226 can generate an output indicative of the volume of material transferred to receiving area 114 at the current landing point once the observed material level or volume is reached.

In another example, once the initial landing point of material in receiving area 114 is identified, then virtual fill processor 228 can obtain an indication of the internal geometry of receiving area 114, at the current landing point, and determine when a sufficient volume or fill height of material has been reached. For instance, once the internal geometry of the receiving area 114 is known, then virtual fill processor 228 can calculate the volume of the receiving area 114 and identify the volume of material that should be transferred at the current landing point in receiving area 114. Virtual fill processor 228 can then detect or estimate the volume of material that has been transferred (based on a sensed mass flow rate, based upon a change in the weight of material in the grain cart 108, based on estimations given the mass flow rate, etc.), to identify the volume of material that has been transferred. Then, the fill height of that material can be estimated, based upon the estimated or sensed volume of material that has been transferred and based also on the internal geometry of receiving area 114 at the current landing point. Again, once the desired fill height has been reached or the desired volume has been transferred, then transfer strategy execution system 146 can generate an output to control signal generator 150 so that control signal generator 150 can control the cart controllable subsystems 154 and/or propulsion vehicle controllable subsystems 156 to move the cart to a new landing point and to generate an output for operator interface system 148 so that the volume of material, the new landing point, etc., can be surfaced (e.g., displayed) for operator 214 on an operator interface 212.

These are just some examples of how transfer strategy execution system 146 can work, and other fill strategies can be executed as well.

Operator interface system 148 can include operator interface mechanisms and control systems to convey information to an operator of tractor 106 and to receive inputs from the operator 214 of tractor 106 in order to control material transfer vehicle 104. Thus, the operator interface mechanisms may include a display screen, a touch sensitive display screen, a point and click device or another device that receives operator inputs, a steering wheel, joysticks, levers, pedals, knobs, buttons, linkages, etc. The operator interface system 148 can also include a microphone and speaker where, for instance, speech recognition and speech synthesis are provided. Operator interface system 148 can include other items for providing audio, visual, and haptic output and receiving operator inputs as well. The operator can be a human operator or an automated operator.

Control signal generator 150 generates control signals to control the cart controllable subsystems 154 and propulsion vehicle controllable subsystems 156 to automatically execute a material transfer operation in which material is transferred from grain cart 108 to receiving area 114 of haulage vehicle 116. Propulsion controller 180 can generate control signals to control the propulsion subsystem 200 of tractor 106 in order to move material transfer vehicle 104 to a desired position relative to haulage vehicle 116. Steering controller 182 generates control signals to control steering subsystem 202 in order to control the heading and/or route of tractor 106 and thus of material transfer vehicle 104. Material conveyance controller 184 generates control signals to control material conveyance subsystem 192 (such as augers or other conveyors) to begin unloading, and to stop unloading, material from grain cart 108. Spout/flap actuator controller(s) 186 generate control signals to control spout actuator 194 and/or flap actuator 196 to control the trajectory and landing point of material exiting spout 112 within receiving area 114. Operator interface controller 188 generates control signals to control operator interface system 148.

Figure 7:
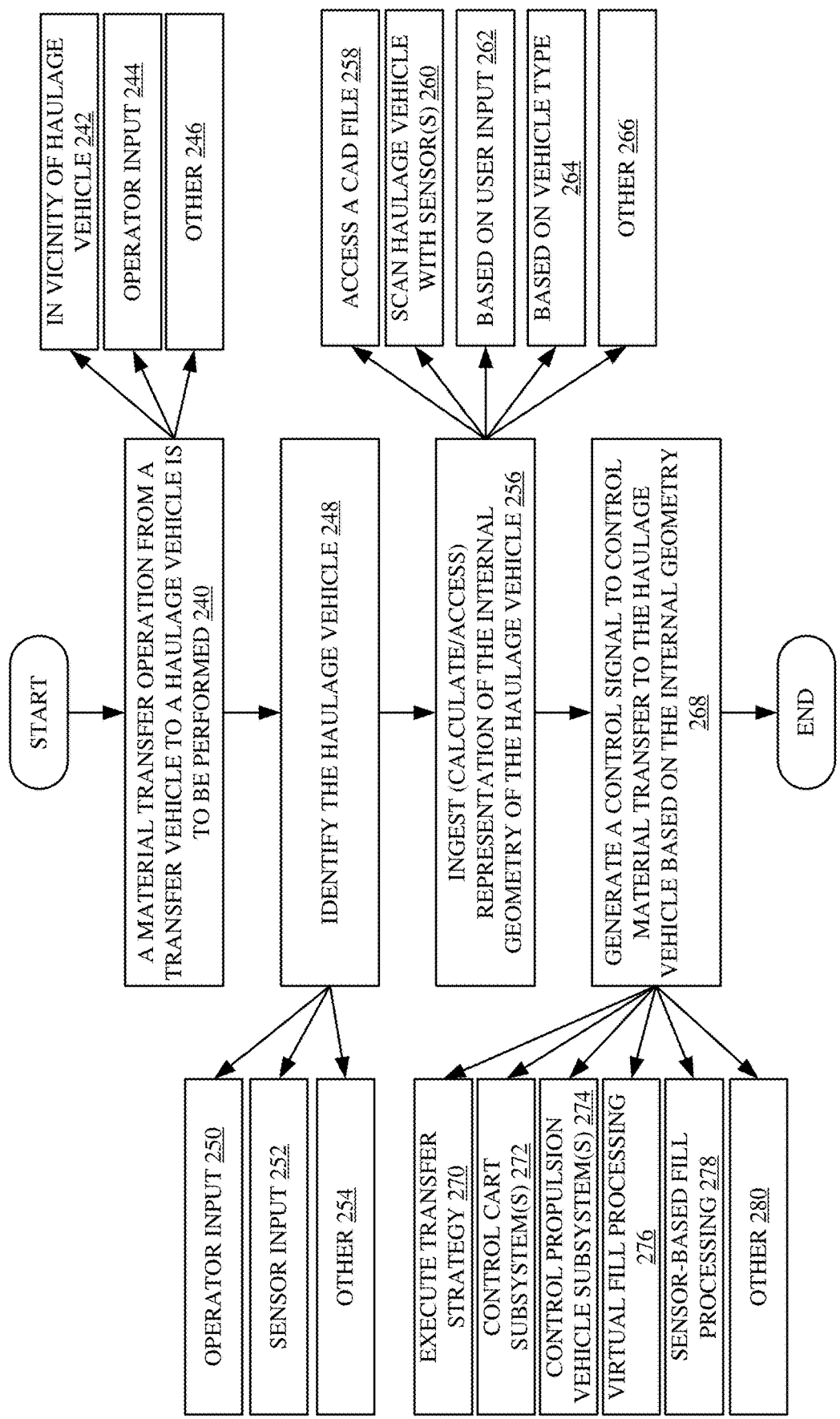
FIG. 7 is a flow diagram illustrating one example of the operation of a material transfer control system.

FIG. 7 is a flow diagram illustrating one example of the operation of material transfer control system 130 shown in FIG. 6. It is first assumed that trigger detection system 143 detects that a material transfer operation from a transfer vehicle 104 to a haulage vehicle 116 is to be performed, as indicated by block 240 in the flow diagram of FIG. 7. In one example, vicinity processor 170 receives a sensor signal indicating that material transfer vehicle 104 is in proximity of haulage vehicle 116, and generates a trigger input which indicates that the material transfer operation is about to commence. Detecting that an operation is to be performed based upon the vicinity of the haulage vehicle is indicated by block 242 in the flow diagram of FIG. 7. In another example, operator 214 can provide an operator input trigger indicating that the material transfer operation is to be commenced, as indicated by block 244. Trigger detection to perform a material transfer operation can be performed in other ways as well, as indicated by block 246.

The haulage vehicle 116 is then identified by machine identifier 145, as indicated by block 248 in the flow diagram of FIG. 7. In one example, operator 214 can provide an operator input identifying haulage vehicle 116 (such as a unique identifier for vehicle 116, the make and model of haulage vehicle 116, etc.). Providing an operator input to identify haulage vehicle 116 is indicated by block 250 in the flow diagram of FIG. 7. In another example, a sensor input can be processed to identify haulage vehicle 116, as indicated by block 252. For instance, optical sensor 122 can provide an image of haulage vehicle 116 to image processor 172 which then identifies the haulage vehicle 116 (such as its make and/or model, the type of haulage vehicle 116, or other information). The haulage vehicle 116 can be identified in any of a wide variety of other ways as well, as indicated by block 254.

Internal geometry ingestion system 152 then ingests a representation of the internal geometry of the haulage vehicle 116 (e.g., the semi-trailer 120), as indicated by block 256 in the flow diagram of FIG. 7. Internal geometry ingestion system 152 can receive the identifier of haulage vehicle 116 and access internal profile data 137 to determine whether an internal profile has already been received or generated for this particular vehicle 116. If not, CAD file ingestion system 216 can use the vehicle identifier to determine whether system 216 can access a CAD file for the identifies vehicle. One example of this is described in greater detail with respect to FIGS. 8-11C. Accessing a CAD file is indicated by block 258 in the flow diagram of FIG. 7.

Sensor-based ingestion system 218 can perform a calibration operation or receive sensor data generated from a scanning operation to generate the internal geometry of haulage vehicle 116 based on sensor data, as indicated by block 260. User input ingestion system 220 can receive user inputs and calculate or generate the internal geometry of haulage vehicle 116 based upon the user inputs, as indicated by block 262. Vehicle type ingestion system 222 can receive an input indicative of the type of haulage vehicle 116 (such as an operator input, a sensor input, etc.), and generate or access the internal geometry of haulage vehicle 116 based upon the vehicle type, as indicated by block 264. The internal geometry of the haulage vehicle 116 can be ingested in other ways as well, as indicated by block 266.

Once the internal geometry of the haulage vehicle 116 is obtained, then control signal generator 150 can generate control signals to control material transfer to the haulage vehicle 116 based upon that internal geometry, as indicated by block 268 in the flow diagram of FIG. 7. For instance, transfer strategy execution system 146 can execute a transfer strategy in transferring the material, as indicated by block 270. Control signal generator 150 can generate control signals to control the cart controllable subsystems 154, as indicated by block 272 and/or to control the propulsion vehicle controllable subsystems 156, as indicated by block 274. Virtual fill processor 228 can be used to perform virtual fill processing by estimating the fill level in haulage vehicle 116 to control the material transfer process without needing inputs from an optical sensor or other fill level sensor, as indicated by block 276 in the flow diagram of FIG. 7. Sensor-based strategy processor 226 can sense the fill level in haulage vehicle 116 to control the material transfer operation based upon the sensed fill level, as indicated by block 278. The control signals can be generated to control the material transfer to haulage vehicle 116 in a wide variety of other ways as well, as indicated by block 280.

In one example, the semi-tractor and trailer pair of haulage vehicle 116 can be jointly identified by machine identifier 145. In another example, trailer 120 can be separately identified. Thus, the term haulage vehicle 116/trailer 120 will refer to, in one example, either the semi-tractor/trailer pair, or trailer 120 by itself, and/or both.

Figure 8:
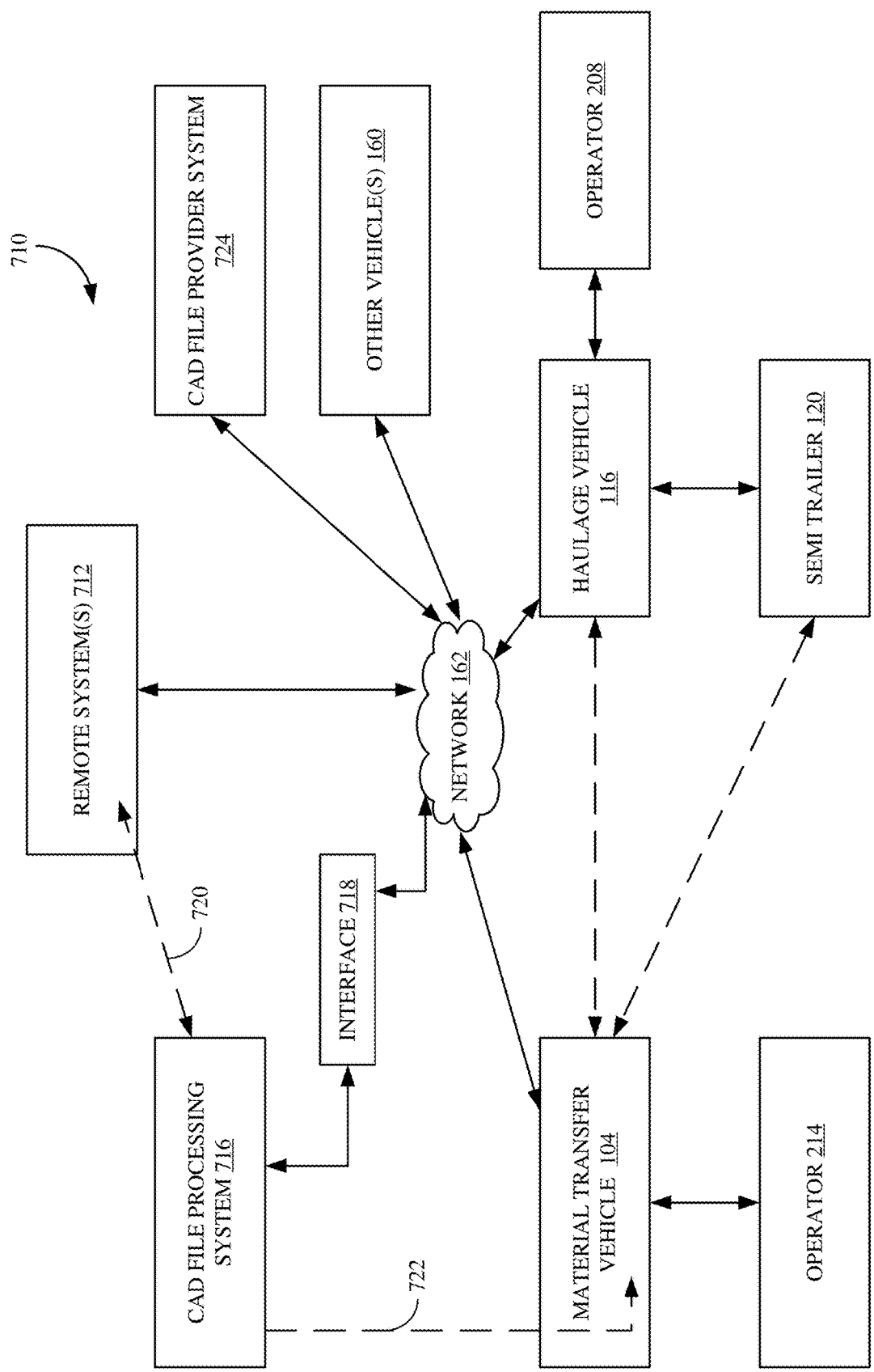
FIG. 8 is a block diagram of an architecture for processing files.

FIG. 8 is a block diagram of one example of a system architecture 710 in which a material transfer vehicle 104 can perform a transfer operation to transfer material into haulage vehicle 116. Architecture 710 also shows that transfer vehicle 104 and/or haulage vehicle 116 (and/or vehicle 120) can be connected to one or more remote systems 712 and other vehicles 160 over a network 162. Similarly, a CAD file processing system 716 can expose an interface 718 for access by other items in architecture 710 over network 162. FIG. 8 also shows that CAD file processing system 716 can reside in one or more remote systems 712 or on material transfer vehicle 104 (as indicated by dashed arrows 720 in 722, respectively) or elsewhere in architecture 710. For example, CAD file processing system 716 can be part of CAD file ingestion system 216 or another part of material transfer control system 130 on vehicle 104, separately disposed on vehicle 104, located in a remote system 712 and accessed by vehicle 104, located on one or more other machines, disbursed among different locations, or disposed in other ways.

FIG. 8 also shows that one or more CAD file provider systems 724 can communicate over network 162 with other items in architecture 710. The CAD file provider system 724 may be controlled by manufacturers or vendors of haulage vehicles 116/trailers 120, or other organizations that have CAD files corresponding to each of a plurality of different types of haulage vehicle 116 or trailers 120. For instance, a CAD file provider system 724 may provide CAD files for multiple different models of haulage vehicle 116/trailers 120. In one example, CAD file provider system 724 can upload the CAD files using interface 718 exposed by CAD file processing system 716 so that the CAD files can be accessed and processed by CAD file processing system 716. Again, it will be noted that CAD file processing system 716 may be located in a remote system 712 that is accessible by material transfer vehicle 104, or in another system. CAD file processing system 716 is shown as a separate system communicating with other items in architecture 710 over network 162 for the sake of example only.

CAD file processing system 716 can obtain the CAD files and run algorithms on the uploaded CAD files in order to generate parameters and dimension information, as well as volume profile information and/or internal geometry data, corresponding to each of the CAD files and thus corresponding to each different type of haulage vehicle 116 and/or trailers 120. The information generated by CAD file processing system 716 (e.g., the derived information) for a plurality of different haulage vehicles 116/trailer 120 can be downloaded and stored as internal profile data 137 on material transfer vehicle 104 automatically, or material transfer vehicle 104 can first identify the haulage vehicle 116 and/or trailer 120 that is about to be loaded with material from material transfer vehicle 104 and, based upon the identity of haulage vehicle 116 or trailer 120, material transfer vehicle 104 can request the CAD file or derived information for the specific haulage vehicle 116 or trailer 120 that is about to be filled. Material transfer control system 150 on material transfer vehicle 104 can then use that derived information to control the unloading process to unload material into haulage vehicle 116 or trailer 120.

For example, CAD file processing system 716 (or another item on material transfer vehicle 104) can generate point cloud data corresponding to optical detection of haulage vehicle 116/trailer 120. That point cloud data can be compared against corresponding data derived from the CAD file for haulage vehicle 116/trailer 120 so that the location, orientation, and/or pose of haulage vehicle 116/trailer 120, relative to material transfer vehicle 104, can be identified. This type of location information can be used to track the location of haulage vehicle 116/trailer 120 relative to material transfer vehicle 104, and thus control the position of the material conveyance subsystem 186 so that material is conveyed to haulage vehicle 116/trailer 120 at desired locations. Similarly, because the volume profile or internal geometry of haulage vehicle 116/trailer 120 is known, then the fill level of material transferred to haulage vehicle 116/trailer 120 can be detected and/or estimated based upon the mass flow of material being transferred and/or the internal geometry or volume profile of vehicle 116/trailer 120. Further, a logistics controller can generate logistics control signals based upon the information derived from the CAD file (such as based upon the volume profile corresponding to the haulage vehicle 116/trailer 120). The logistics control signals can be control signals that are used to control various operations based upon the volume capacity and volume profile of a haulage vehicle 116/trailer 120 (e.g., which material transfer vehicle should be dispatched for unloading to which haulage vehicle 116/trailer 120), as well as the volume of material that is actually loaded into a haulage vehicle 116/trailer 120, among other things.

Figure 9:
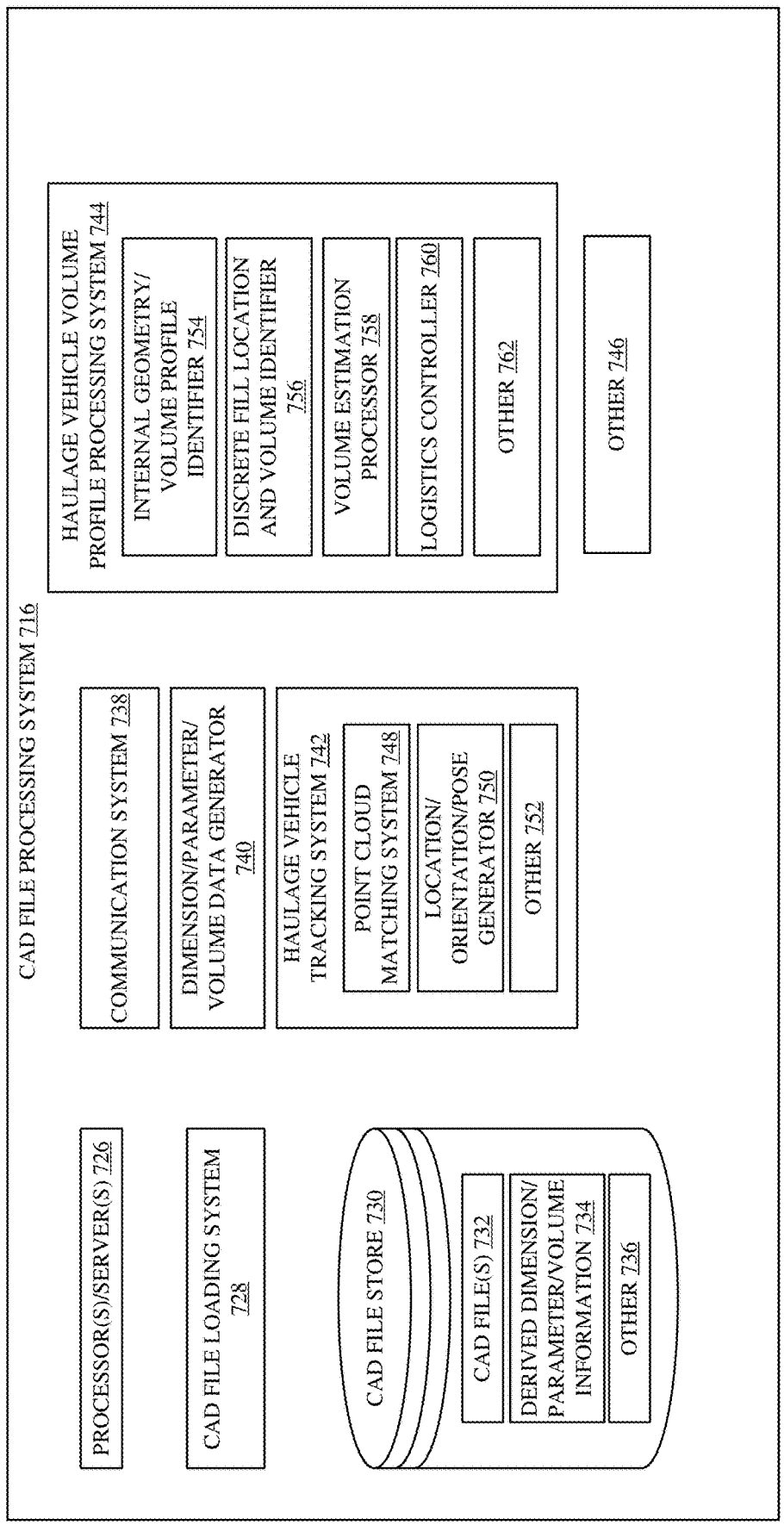
FIG. 9 is a block diagram of a CAD file processing system.

FIG. 9 is a block diagram showing one example of CAD file processing system 716 in more detail. In the example shown in FIG. 9, CAD file processing system 716 includes one or more processors or servers 726, CAD file loading system 728, CAD file store 730 (which may include one or more CAD files 732, derived dimension/parameter/volume (or internal geometry) information 734, and other items 736), communication system 738, dimension/parameter/volume data generator 740, haulage vehicle tracking system 742, haulage vehicle volume profile processing system 744, and other items 746. Haulage vehicle tracking system 742 can include point cloud matching system 748, location/orientation/pose generator 750, and other items 752. Haulage vehicle volume profile processing system 744 can include internal geometry/volume profile identifier 754, discrete fill location and volume identifier 756, volume estimation processor 758, logistics controller 760, and other items 762. Before describing the operation of CAD file processing system 716 in more detail, a description of some of the items in CAD file processing system 716 and their operation, will first be provided.

CAD file loading system 728 illustratively exposes the interface 718 (shown in FIG. 8) which can be accessed by CAD file provider systems 724 to upload CAD files for various different haulage vehicles 116/trailer 120. Dimension/parameter/volume data generator 740 can run algorithms on the CAD files to generate the parameter and dimension information, as well as the volume profile (or internal geometry) information that describes the volume or volume profile corresponding to the haulage vehicle 116/trailer 120 represented by the CAD file. The CAD file 732 along with the derived dimension/parameter/volume information 734 can then be stored in CAD file store 730, and indexed by identifiers that identify the different corresponding haulage vehicles 116/trailers 120.

When material transfer vehicle 104 is, or is about to, unload material into a haulage vehicle 116/trailer 120, haulage vehicle tracking system 742 can use the CAD file 732 and/or the derived information 734 corresponding to that haulage vehicle 116/trailer 120 in order to track the location, orientation, and/or pose of the haulage vehicle 116/trailer 120 relative to material transfer vehicle 104. In one example, an optical sensor 122 on material transfer vehicle 104 or a handheld sensor 142, or a sensor 142 on an unmanned aerial vehicle, captures images or other information corresponding to haulage vehicle 116/trailer 120 and generates point cloud data from the captured images. For instance, the point cloud data can be generated from images captured by a stereo camera or in other ways. The point cloud data can then be matched against information in CAD files 732 or derived information 734 in order to identify the location, orientation, and/or pose of haulage vehicle 116/trailer 120 relative to the optical sensor 122, and thus relative to the material conveyance subsystem 192 on material transfer vehicle 104. The location, orientation, and/or pose can be output to transfer strategy execution system 146, control signal generator 150, or output to another item in material transfer control system 130, so the unloading operation can be controlled accordingly.

Haulage vehicle volume profile processing system 744 identifies or generates the haulage vehicle volume profile (or other internal geometry) from the CAD files 732 or from the derived information 734. Discrete fill location and volume identifier 756 divides the volume profile into discrete parts (e.g., discrete volumes, along the front-to-back axis of haulage vehicle 116/trailer 120 or in another way). Each of the discrete areas can correspond to a landing point where material conveyance subsystem 192 will be controlled to convey material within haulage vehicle 116/trailer 120. Therefore, the discrete fill locations and corresponding volumes generated by identifier 756 can be provided to transfer strategy execution system 146 and/or control signal generator 150, or to other items in control system 130, to be used during the unloading operation. By way of example, the material conveyance subsystem 192 can be controlled to convey material to the different discrete locations in haulage vehicle 116/trailer 120 according to a desired fill pattern (e.g., front-to-back, back-to-front or multi-pass fill pattern) based on fill level, based on detected or estimated transferred volume or weight, etc.

Volume estimation processor 758 can obtain an indication (sensed or estimated) of the fill level of material in each of the discrete unloading locations and estimate the volume of material that has been unloaded into each of those locations based on the volume (or other internal geometry) of each discrete location and based on the fill level in each discrete location. By way of example, if the volume profile of each discrete location is known, and the fill height or other indication of fill level that measures the level of material unloaded into each of the discrete locations is known (either sensed or estimated), then the volume of material unloaded into each of the discrete locations can be generated as well. Volume estimation processor 758 also aggregates the volume of material loaded into each of the discrete locations to obtain an overall volume of material that has been unloaded into the haulage vehicle 116/trailer 120. The volume information (e.g., the volume capacity for a haulage vehicle 116/trailer 120 as well as the volume of material loaded into haulage vehicle 116/trailer 120), can be used by logistics controller 760 to generate logistics control signals. The logistics control signals can control material transfer vehicle dispatch which determines which particular material transfer vehicles are to be sent to the different haulage vehicles, and when the material transfer vehicles are to be dispatched, as well as to control other transport and control logistics.

Figure 10:
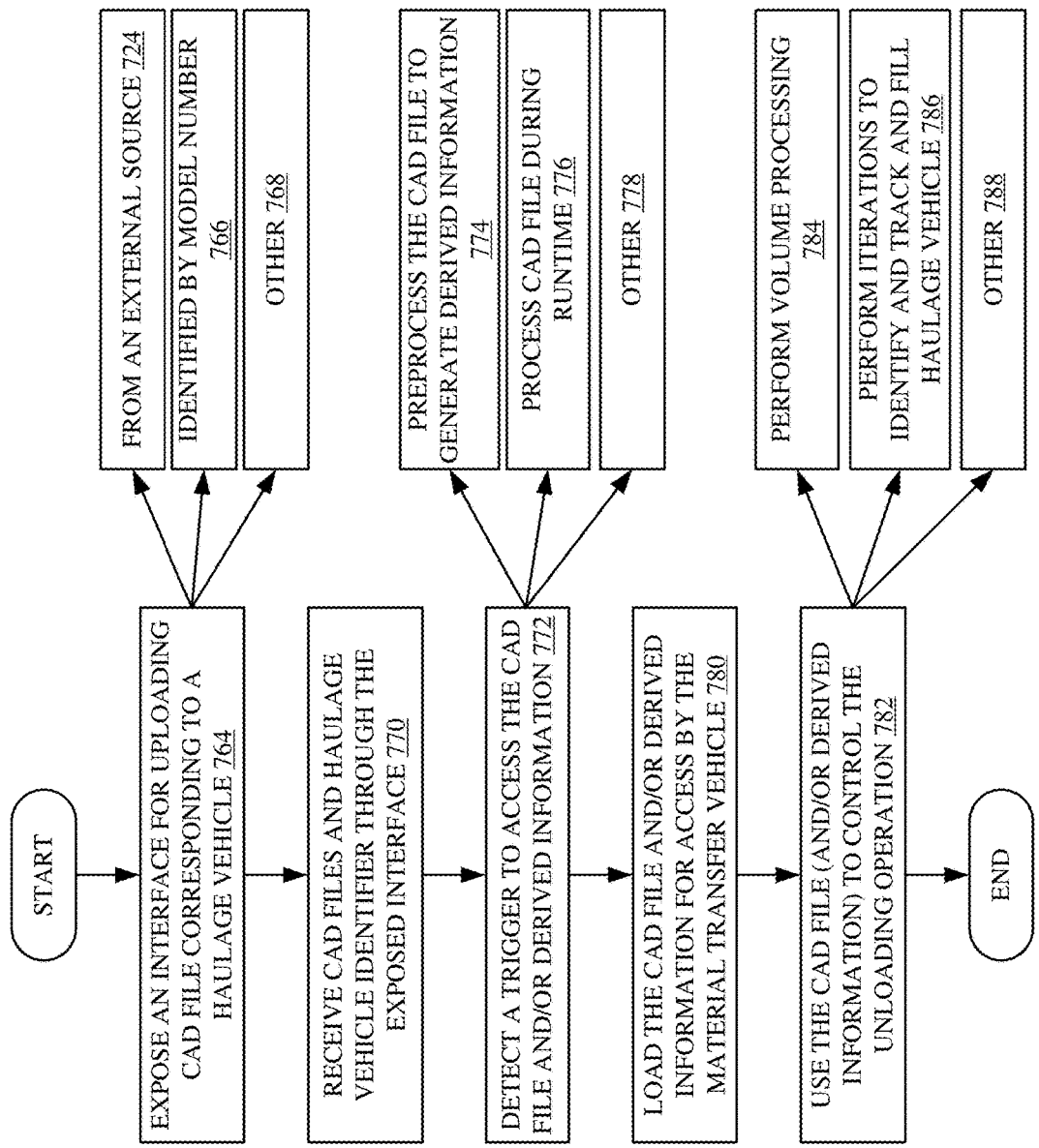
FIGS. 10, 11A, 11B, and 11C are flow diagrams illustrating the operation of the CAD file processing system.

FIG. 10 is a flow diagram illustrating one example of the operation of architecture 710 in obtaining and utilizing CAD files for a plurality of different haulage vehicles 116/trailer 120. In one example, CAD file processing system 716 exposes interface 718 for uploading CAD files corresponding to haulage vehicles/trailers, as indicated by block 764 in the flow diagram of FIG. 10. It should be noted that the CAD file store 730 can be in CAD file processing system 716 or elsewhere in architecture 710.

In one example, the CAD files are uploaded from an external source, such as CAD file provider system 724. Each CAD file may be identified by the model number of the haulage vehicle 116/trailer 120 that it represents, or in other ways, as indicated by block 766. The CAD files can be uploaded in other ways as well, as indicated by block 768.

The CAD file processing system 716 eventually receives a CAD file and a vehicle identifier (that identifies the haulage vehicle 116/trailer 120 corresponding to the CAD file) through the exposed interface 718, as indicated by block 770 in the flow diagram of FIG. 10. At some point, CAD file processing system 716 detects a trigger indicating that a material transfer vehicle 104 wishes to access the CAD file (or information derived from the CAD file), as indicated by block 772 in the flow diagram of FIG. 10. For instance, in one example, the trigger may be that communication system 738 receives a request from a material transfer vehicle 104 for the CAD file or derived information. In another example, such as where the CAD file processing system 716 is located on material transfer vehicle 104, then as soon as the identity of haulage vehicle 116/trailer 120 is obtained, that can serve as a trigger for CAD file processing system 716 to output the CAD file 732 or the derived information 734 corresponding to the identified haulage vehicle 116/trailer 120. It will be noted that CAD file processing system 716 can run the processing algorithms to preprocess the CAD file 732 to generate the dimension/parameter/volume data 734. Preprocessing the CAD file 732 (before it is requested) is indicated by block 774 in the flow diagram of FIG. 10. Also, the CAD files 732 may be processed during runtime so that the dimension/parameter/volume data can be generated as it is requested by a material transfer vehicle 104. Processing the CAD file during runtime is indicated by block 776. Detecting a trigger to access the CAD file or derived information can be performed in other ways as well, as indicated by block 778.

The CAD file and/or the derived information is then loaded into haulage vehicle tracking system 742 and/or haulage vehicle volume profile processing system 744 so that the tracking information and/or volume profile information can be used by material transfer vehicle 104. Loading the CAD file and/or derived information in such a way is indicated by block 780 in the flow diagram of FIG. 10.

The CAD file and/or the derived information are then used by material transfer vehicle 104 in order to control the unloading operation, as indicated by block 782 in the flow diagram of FIG. 10. In one example, haulage vehicle volume profile processing system 744 can perform volume processing, as indicated by block 784. Haulage vehicle tracking system 742 can also generate outputs that can be used to track the haulage vehicle 116/trailer 120 during an unloading operation, as indicated by block 786. The CAD file and/or derived information can be used to control the unloading operation in other ways as well, as indicated by block 788.

Figure 11A:
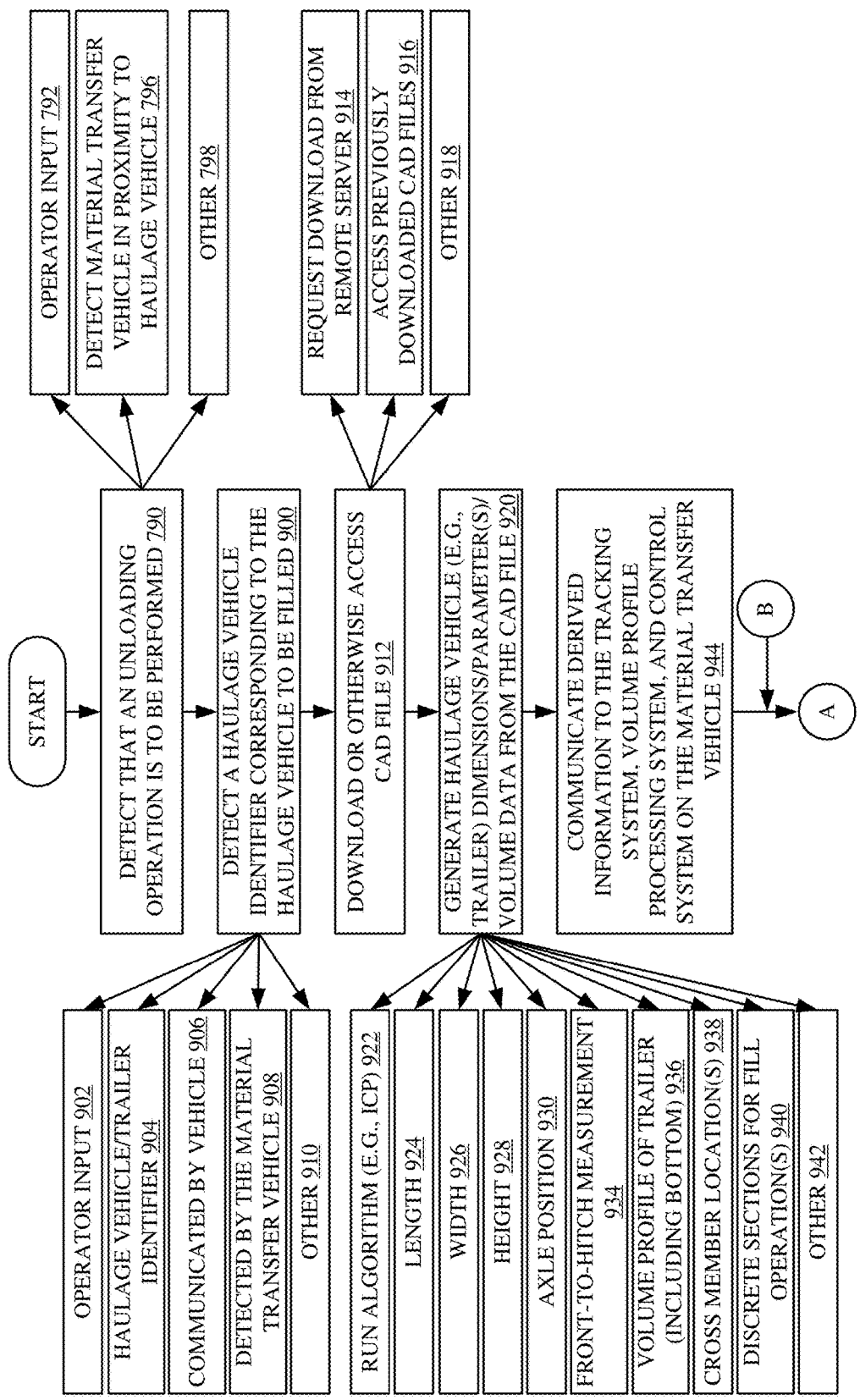
Figure 11B:
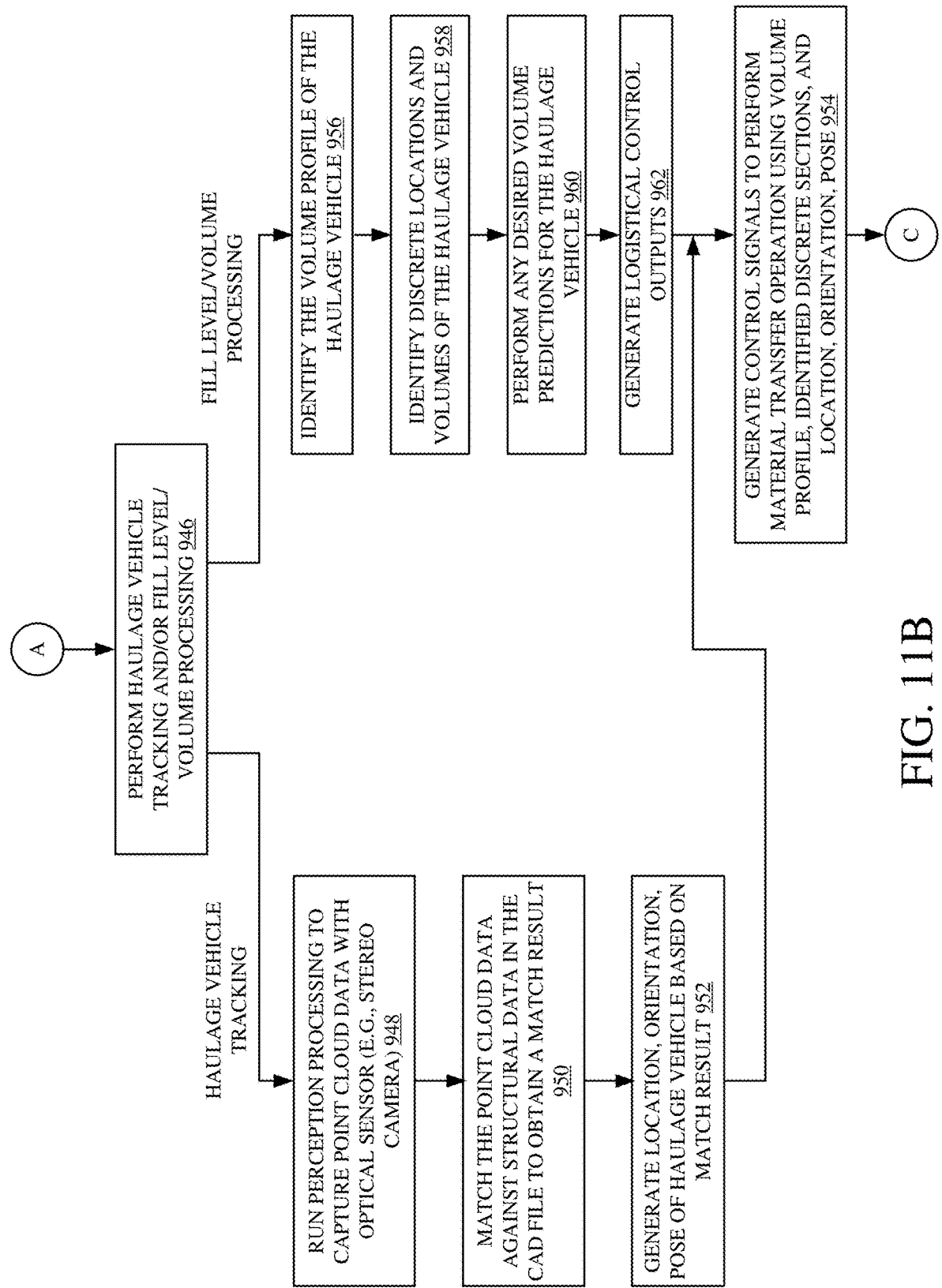
Figure 11C:
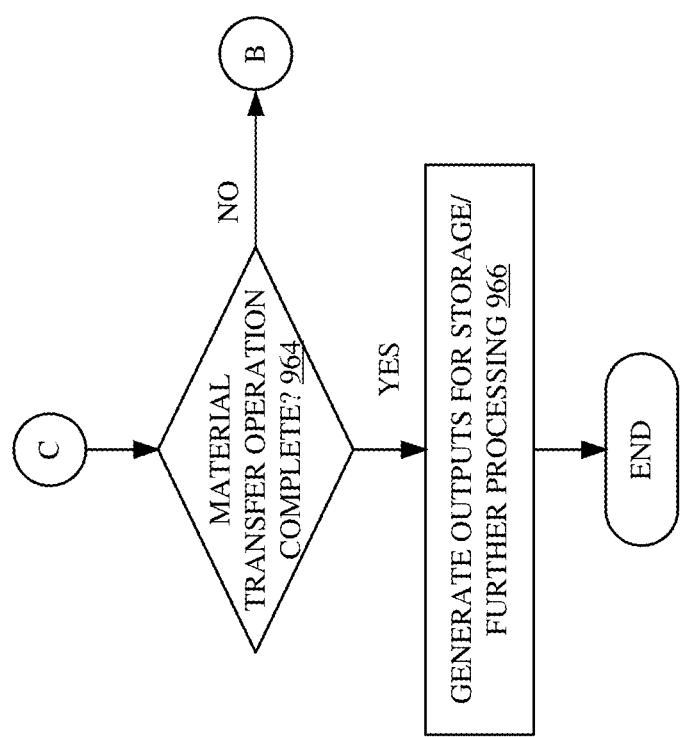

FIGS. 11A, 11B, and 11C (collectively referred to herein as FIG. 11) show a flow diagram illustrating one example of the operation of CAD file processing system 716 and material transfer control system 130 in controlling an unloading operation and performing volume estimation and logistics processing. It is assumed for the sake of describing FIG. 11 that trigger detection system 143 detects that a material transfer vehicle 104 is about to perform an unloading operation to unload material into a haulage vehicle 116/trailer 120. Detecting that an unloading operation is to be performed is indicated by block 790 in the flow diagram of FIG. 11. In one example, operator 214 can provide an operator input 792 indicating that a material transfer operation is about to be performed. In another example, material transfer sensors 142 can detect that a material transfer vehicle 104 and haulage vehicle 116 are in a proximity of one another indicating that an unloading operation is about to begin, as indicated by block 796. Detecting that an unloading operation is about to be performed can be performed in other ways as well, as indicated by block 798.

Machine identifier 145 detects an input that includes a haulage vehicle/trailer identifier that identifies the haulage vehicle 116/trailer 120 that is to be filled. Detecting the haulage vehicle/trailer identifier is indicated by block 900 in the flow diagram of FIG. 11. The vehicle identifier can be based on an operator input 902 (such as from operator 214 manually communicating the vehicle identifier, or from operator 214 manually inputting the vehicle identifier). The haulage vehicle/trailer identifier may be the vehicle identification number (VIN) for haulage vehicle 116, as indicated by block 904. The haulage vehicle/trailer identifier may be communicated by/to the other vehicles 160, as indicated by block 906 in the flow diagram of FIG. 11. The haulage vehicle/trailer identifier can be detected by a sensor 142 on material transfer vehicle 104, as indicated by block 908. The haulage vehicle/trailer identifier can be detected or obtained in other ways as well, as indicated by block 910.

If the derived information 734 has not already been generated for the identified haulage vehicle 116/trailer 120, then CAD file loading system 728 loads the CAD file 732 or otherwise accesses the CAD file 732 corresponding to the haulage vehicle 116/trailer 120. Downloading or accessing the CAD file 732 is indicated by block 912 in the flow diagram of FIG. 11. In one example, CAD file loading system 728 can request loading of the CAD file 732 from the CAD file provider system 724, as indicated by block 914. In another example, the CAD file 732 may have already been downloaded and can simply be accessed to generate the derived information 734, as indicated by block 916. The CAD file 732 can be obtained in other ways as well, as indicated by block 918.

Dimension/parameter/volume data generator 740 then generates haulage vehicle/trailer dimension/parameter/volume data or other internal geometry data (the derived data) from the CAD file, as indicated by block 920 in the flow diagram of FIG. 11. In one example, the generator 740 can run one or more algorithms (e.g., the ICP algorithm or other algorithms) against the CAD file 732 to generate the derived information, as indicated by block 922. Some of the derived information can include the haulage vehicle/trailer length 924, width 926, height 928, axle position 930 on the haulage vehicle 116/trailer 120, the front-to-hitch point measurement 934, the volume profile of the haulage vehicle/trailer (e.g., including the volume profile of the bottom portion of the haulage vehicle/trailer which may be unseen) as indicated by block 936, the cross member locations 938 on the haulage vehicle/trailer, as well as the location of the discrete sections of the haulage vehicle 116/trailer 120 that may be used during the fill operation, as indicated by block 940. The derived information can include any of a wide variety of other information 942, including other internal geometry information, as well. The derived information can be communicated to the haulage vehicle tracking system 742, the haulage vehicle volume profile processing system 744, and/or other portions of the material transfer control system 130 (such as other portions of CAD file processing system 216, transfer strategy execution system 146, control signal generator 150, etc.) on the material transfer vehicle 104, as indicated by block 944 in the flow diagram of FIG. 11.

Haulage vehicle tracking system 742 can generate outputs indicative of the location, orientation, and/or pose of haulage vehicle 116/trailer 120, relative to the material conveyance subsystem 192 on material transfer vehicle 104. Haulage vehicle volume profile processing system 744 can generate outputs indicative of the volume profile or internal geometry of haulage vehicle 116/trailer 120 and the volume of material loaded into the various discrete sections of haulage vehicle 116/trailer 120. Material transfer control system 130 can generate outputs controlling the unloading operation as well. Performing haulage vehicle tracking and/or fill level/volume processing is indicated by block 946 in the flow diagram of FIG. 11.

In order to perform haulage vehicle tracking, point cloud matching system 748 can receive point cloud data that is generated using an optical sensor 122 (such as a stereo camera) or other sensor 142. The point cloud information can be generated by image processor 172 or a system running a perception algorithm based upon the captured images. Capturing the point cloud data corresponding to haulage vehicle 116/trailer 120 is indicated by block 948 in the flow diagram of FIG. 11.

Point cloud matching system 748 then matches the point cloud data captured from haulage vehicle 116/trailer 120 against the structural data in the CAD file (or the derived data) to obtain a match result, as indicated by block 950. For instance, point cloud matching system 748 may attempt to take the point cloud data captured from the haulage vehicle 116/trailer 120 and align that data against similar point cloud data derived from the CAD file. The matching result may indicate the orientation, location or position, and/or pose of haulage vehicle 116/trailer 120 in the captured image.

Location/orientation/pose generator 750 then uses the match result (the way that the captured point cloud data is transformed in order to align with the CAD file data) to generate a location, orientation, and/or pose of the haulage vehicle 116/trailer 120 relative to the material transfer vehicle 104 (and, in one example, relative to the material conveyance subsystem 192 on the material transfer vehicle 104). Generating the location, orientation, and/or pose of the haulage vehicle 116/trailer 120 is indicated by block 952 in FIG. 11. The output from generator 750 can include coordinates in a global or local coordinate system that identify the location, orientation, and/or pose of haulage vehicle 116/trailer 120. Those coordinates can then be transformed into the coordinate system of the material transfer vehicle 104 so that the location, orientation, and/or pose of haulage vehicle 116/trailer 120 can be identified relative to the location of material conveyance subsystem 192 so that the material transfer operation can be performed (e.g., nudges can be generated to change the relative position of material transfer vehicle 104 and haulage vehicle 116/trailer 120) in order to perform a desired material transfer operation.

Transfer strategy execution system 146 and control signal generator 150 can then generate control signals to perform a material transfer operation using the volume profile (or internal geometry) of haulage vehicle 116/trailer 120, the discrete sections identified in haulage vehicle 116/trailer 120, as well as the location, orientation, and/or pose of haulage vehicle 116/trailer 120. Generating the control signals to perform the desired material transfer operation is indicated by block 954 in the flow diagram of FIG. 11. Generating the control signals to perform the material transfer operation can also include generating an output indicating the volume of material that has been loaded into each of the discrete locations in haulage vehicle 116/trailer 120.

Haulage vehicle volume profile processing system 744 can perform the volume profile processing in conjunction with, or sequentially with, the processing being performed by haulage vehicle tracking system 742. In one example, volume profile identifier 754 identifies the volume profile (or internal geometry) of the haulage vehicle 116/trailer 120, as indicated by block 956 in the flow diagram of FIG. 11. Discrete fill location and volume identifier 756 can identify the discrete fill locations on haulage vehicle 116/trailer 120, as well as the volume corresponding to each of those locations. Identifying the discrete locations of the haulage vehicle 116/trailer 120 that are to be used along with the volume of each of those sections is indicated by block 958 in the flow diagram of FIG. 11.

Volume estimation processor 758 can also perform any desired volume predictions for the haulage vehicle 116/trailer 120, such as aggregating the volume of the discrete sections in haulage vehicle 116/trailer 120 to obtain an overall material volume capacity for haulage vehicle 116/trailer 120. Performing such volume predictions for haulage vehicle 116/trailer 120 is indicated by block 960 in the flow diagram of FIG. 11.

Logistics controller 760 can generate logistics control outputs, as indicated by block 962. The logistics control outputs can include dispatch control outputs that control which material/transfer vehicles are dispatched to which haulage vehicles 116/trailers 120, the timing of dispatch, among other things.

Until the material transfer operation is complete, as determined at block 964 in the flow diagram of FIG. 11, processing can revert back to block 946 where CAD file processing system 716 continues to perform the receiving vehicle tracking operations as well as the fill level/volume processing. Once the material transfer operation is complete, then CAD file processing system 716 can generate outputs for storage or further processing, as indicated by block 966 in the flow diagram of FIG. 11.

It can thus be seen that the present description describes a system in which a CAD file corresponding to a haulage vehicle 116/trailer 120 is obtained and processed to obtain a volume profile for that haulage vehicle/trailer. The volume profile can be used to control a material transfer operation and to generate logistics control signals.

Figure 12:
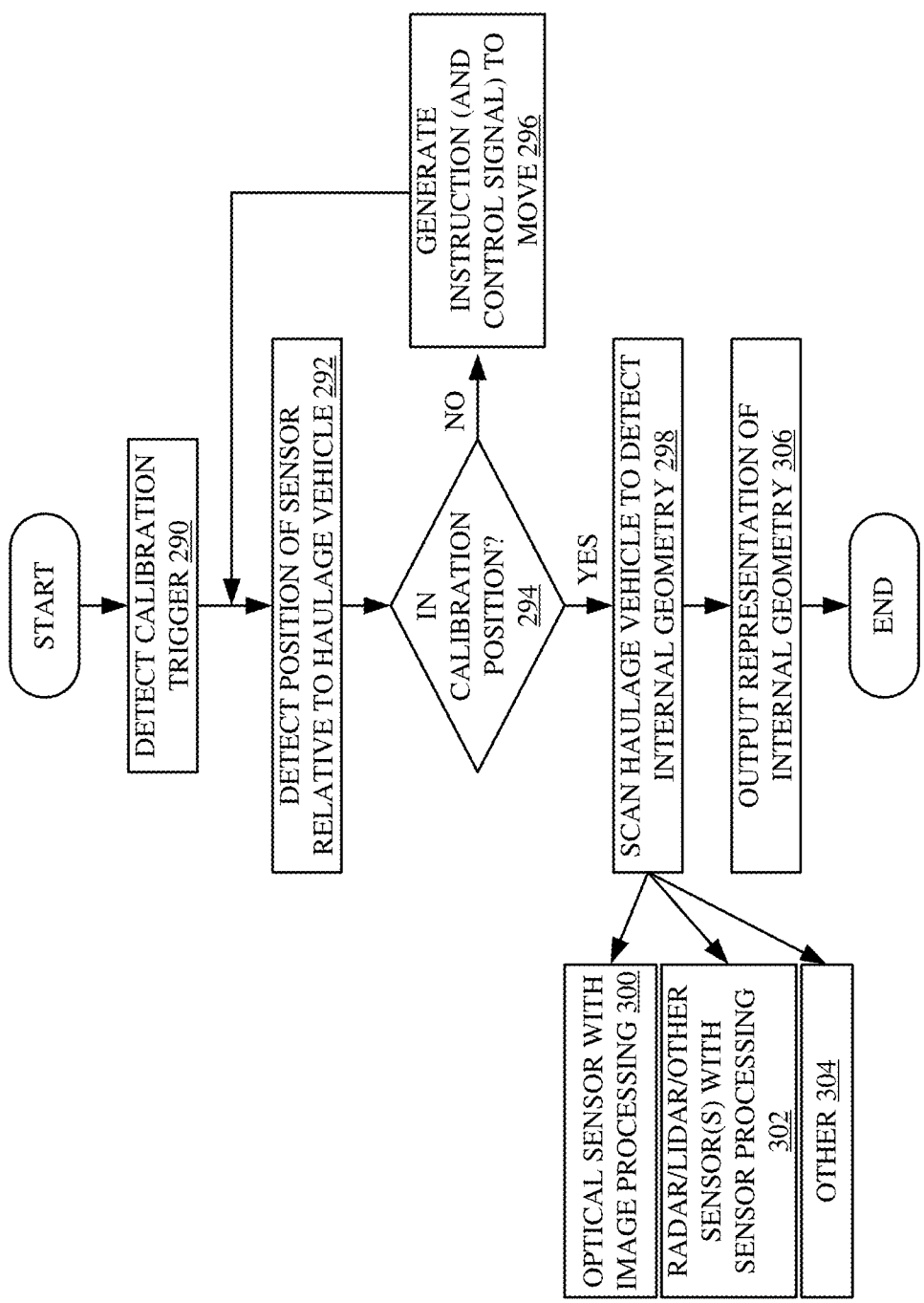
FIG. 12 is a flow diagram showing one example of the operation of the material transfer control system, in more detail.

FIG. 12 is a flow diagram illustrating one example of the operation of sensor-based ingestion system 218. In sensor-based ingestion, a sensor 142 is used to scan or otherwise sense haulage vehicle 116/trailer 120 in order to generate data from which the internal geometry of haulage vehicle 116/trailer 120 can be generated. In the example described with respect to FIG. 12, it will be assumed that the sensor 142 that is used to scan the haulage vehicle 116/trailer 120 in order to detect its internal geometry is the sensor 122 mounted on material transfer vehicle 104. It will be noted, however, that the sensor 142 could be a handheld sensor, a sensor mounted on an unmanned aerial vehicle, or any of a wide variety of other sensors that can be positioned in a proper position to generate sensor signals indicative of the interior geometry of haulage vehicle 116/trailer 120. This operation may be referred to as a calibration operation, so trigger detection system 143 first detects a calibration trigger as indicated by block 290 in the flow diagram of FIG. 12. The calibration trigger may be based on an operator input, or other trigger criteria.

Sensor-based ingestion system 218 can then use vicinity processor 170 or other processors to detect the position of the sensor 122 relative to haulage vehicle 116/trailer 120 to determine whether the two vehicles are in calibration position with respect to one another (e.g., so that the sensor 122 can generate sensor data indicative of the internal geometry of haulage vehicle 116/trailer 120). Detecting the position of the sensor 122 relative to the haulage vehicle 116/trailer 120 is indicated by block 292 in the flow diagram of FIG. 12. If the sensor 122 is not in calibration position, as determined at block 294, then control signal generator 150 generates control signals to control the propulsion subsystem 200 and/or steering subsystem 202 of propulsion vehicle controllable subsystems 156 in order to change the relative position of the sensor 122 relative to the haulage vehicle 116/trailer 120 to move it into the calibration position. In the example where the sensor is optical sensor 122, then image processor 172 processes the images captured by sensor 122 to determine whether the sensor 122 has an adequate view of the haulage vehicle 116/trailer 120 in order that the interior geometry may be sensed. If not, then sensor-based ingestion system 218 generates an output indicative of the direction and distance that the sensor 122 must be moved in order to move into a proper calibration position. Generating control signals to move the material transfer vehicle 104 until the sensor 122 is in proper calibration position is indicated by block 296 in the flow diagram of FIG. 12.

Once the sensor 122 is in the proper calibration position, then the material transfer vehicle 104 is controlled so that the sensor 122 can scan the haulage vehicle 116/trainer 120 to detect data indicative of its internal geometry, as indicated by block 298.

Again, as discussed above, the sensor can be optical sensor 122 with image processor 172, as indicated by block 300 in the flow diagram of FIG. 12. The sensor can also be an ultrasound sensor 164, a RADAR or LIDAR sensor 166, or other sensor 168, along with the appropriate sensor processing system, as indicated by block 302 in the flow diagram of FIG. 12. The sensor can also be any of a wide variety of other types of sensors with appropriate sensor processing systems, as indicated by block 304.

Once the haulage vehicle 116/trailer 120 has been scanned by the sensor, and the internal geometry of the haulage vehicle 116/trailer 120 has been generated by sensor-based ingestion system 218, a representation of that internal geometry is output by sensor-based ingestion system 218 for use by transfer strategy execution system 146, control signal generator 150, and/or other items. It will also be noted that the internal geometry can be output to other machines 160, stored in other systems 158, stored as internal profile data 137 corresponding to this particular haulage vehicle 116/trailer 120, or output in other ways. Outputting the representation of the internal geometry is indicated by block 306 in the flow diagram of FIG. 12.

Figure 13:
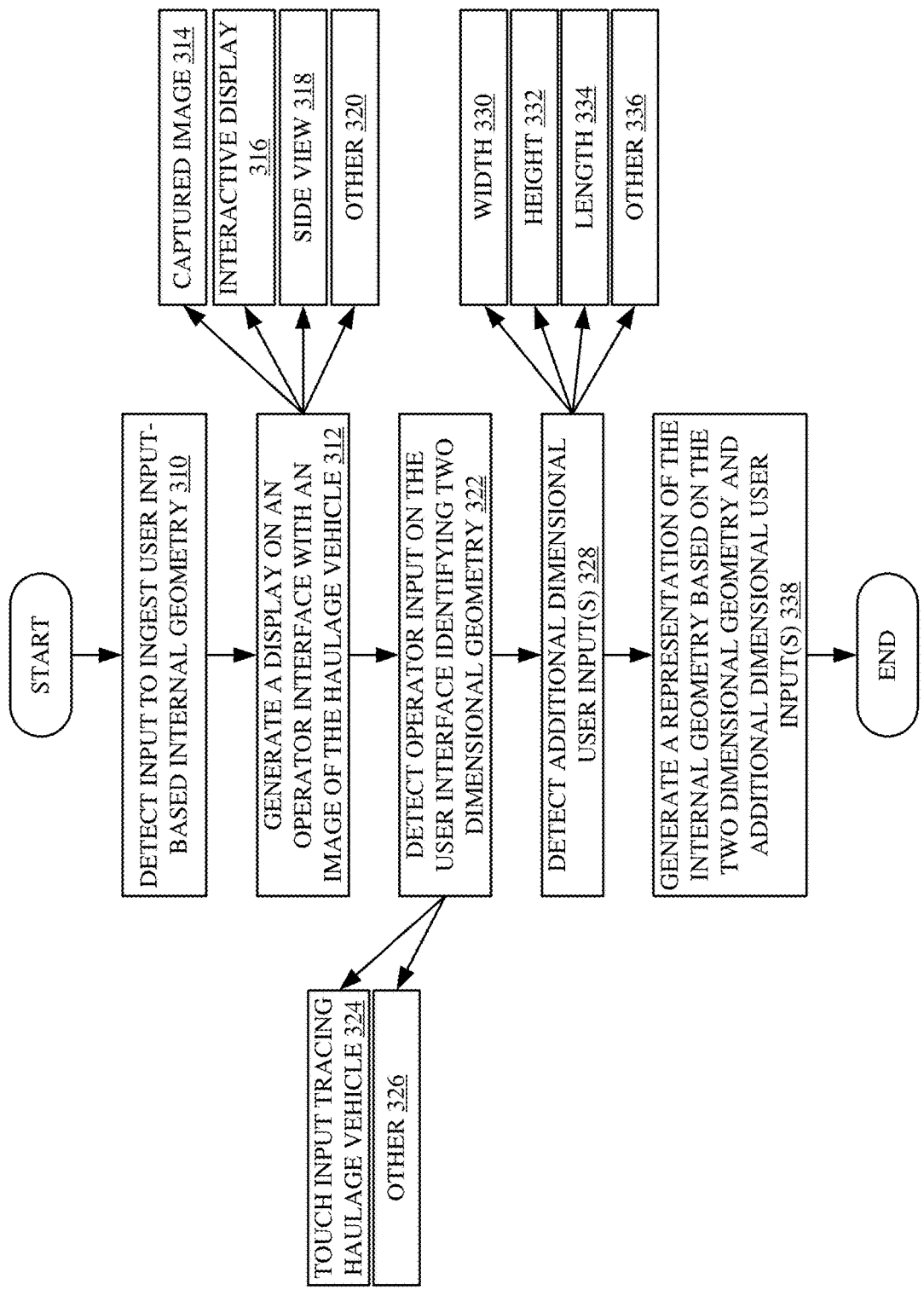
FIGS. 13, 14A are flow diagrams showing operation of the internal geometry ingestion system.

FIG. 13 is a flow diagram illustrating one example of the operation of user input ingestion system 220 in generating a representation of the internal geometry of haulage vehicle 116/trailer 120 based on user inputs. In one example, operator 214 first provides an input detected by trigger detection system 143 indicating that the user wishes to generate a representation of the internal geometry of a haulage vehicle 116/trailer 120. Detecting such an input is indicated by block 310 in the flow diagram of FIG. 13. In one example, user input ingestion system 220 controls operator interface system 148 to generate an operator interface that shows an image of the haulage vehicle 116/trailer 120, as indicated by block 312. In one example, for instance, user input ingestion system 220 uses optical sensor 122 to capture an image of a side view of trailer 120. Capturing such an image is indicated by block 314. That image (or a computer generated image or simulated image or stored image) can then be displayed on an interactive display 316, such as a touch sensitive display or on another display that operator 214 can interact with. The image may be a side view 318 or any of a variety of other views as indicated by block 320.

User input ingestion system 220 then uses operator interface system 148 to prompt an operator for an input and detect operator input on the user interface, identifying a two-dimension geometry. By way of example, the operator 214 may trace the outline of the captured image of the trailer 120 to indicate the side profile of the trailer 120 using a touch input, a stylus input, a point-and-click device, etc.

Detecting an operator input identifying a two-dimensional geometry is indicated by block 322. Detecting a touch input tracing over an image of the haulage vehicle 116/trailer 120 is indicated by block 324. Of course, the operator input can be provided in a wide variety of other ways to define a two-dimensional geometry, as indicated by block 326.

User input ingestion system 220 can then use operator interface system 148 to detect additional dimensional inputs that are provided by the operator, as indicated by block 328 in the flow diagram of FIG. 13. For instance, operator 214 may provide inputs identifying the width 330, height 332, length 334, or any of a wide variety of other dimensional information 336 corresponding to the haulage vehicle 116/trailer 120.

Once the two-dimensional geometry is input, along with any additional dimensional information, then user input ingestion system 220 generates a representation of the internal geometry of the haulage vehicle 116/trailer 120 based on the two-dimensional geometry and any additional dimensional information input by the user. Generating the representation of the internal geometry in this way is indicated by block 338 in the flow diagram of FIG. 13. The internal geometry can then be used to control the material transfer operation.

Figure 14A:
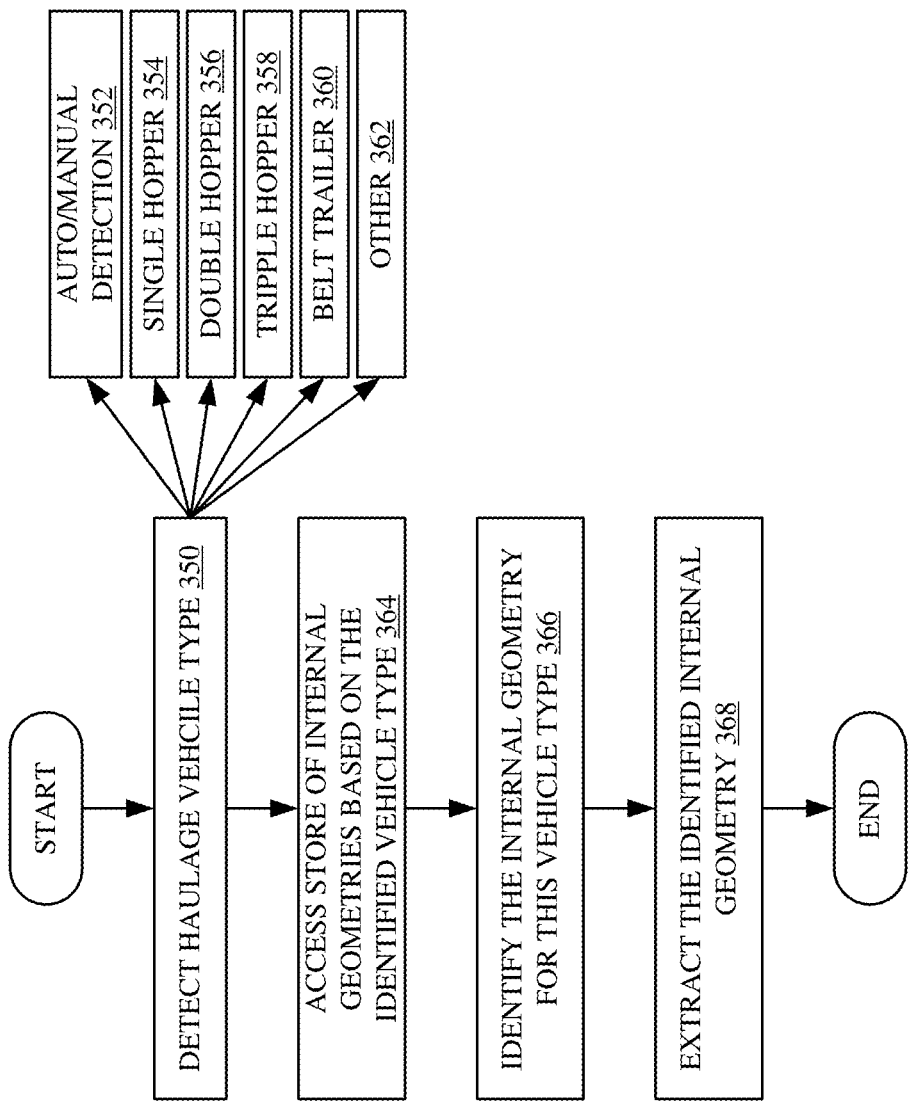

FIG. 14A is a flow diagram illustrating one example of the operation of vehicle type ingestion system 222 in which system 222 generates or accesses a representation of the internal geometry of the haulage vehicle 116/trailer 120 based upon the vehicle type. Vehicle type ingestion system 222 first receives an input (e.g., a sensor input or a manual input) that identifies the type of haulage vehicle 116/trailer 120, as indicated by block 350 in the flow diagram of FIG. 14A. Again, the input can be an automated input or a manual input, as indicated by block 352.

Figure 14B:
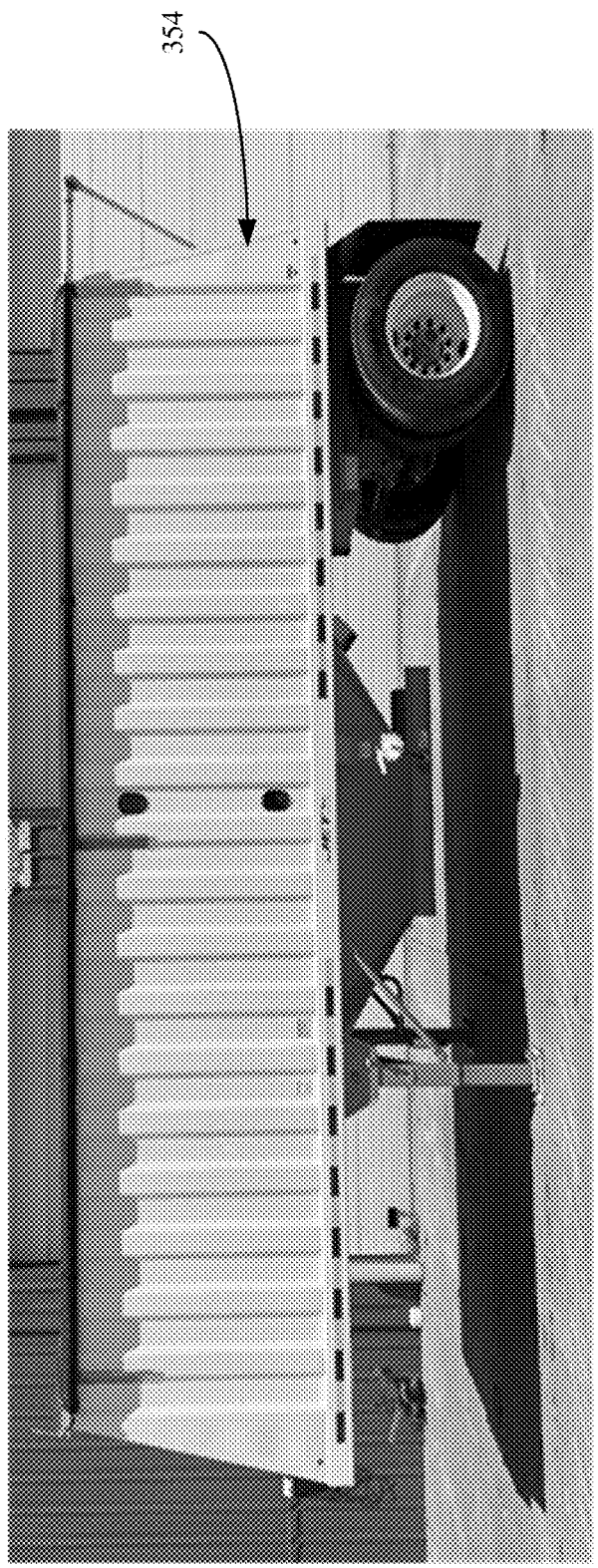
FIGS. 14B, 14C, 14D, and 14E show examples of different types of haulage vehicles.
Figure 14C:
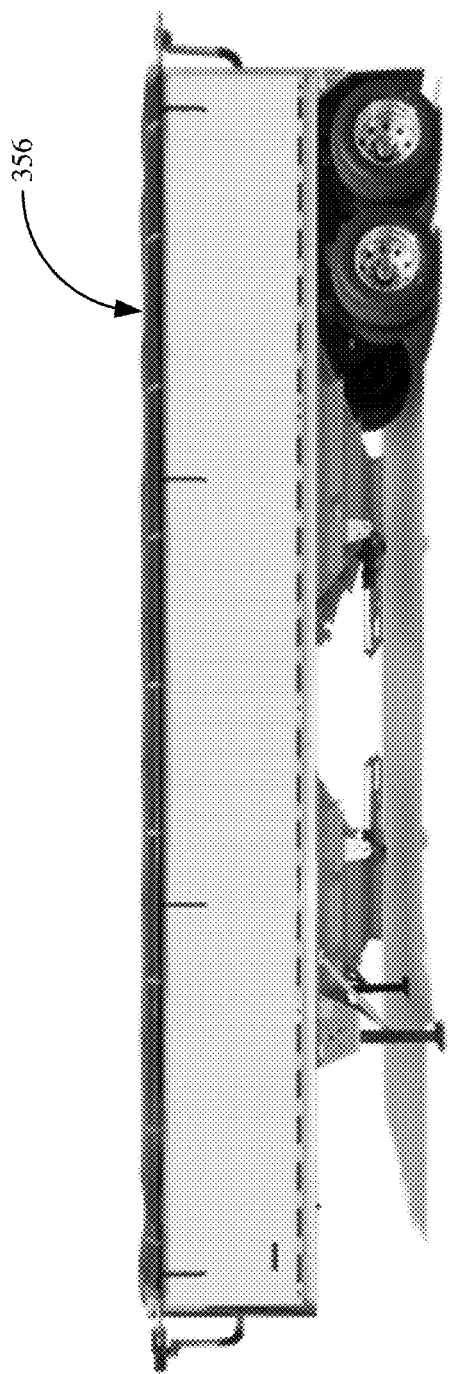
Figure 14D:
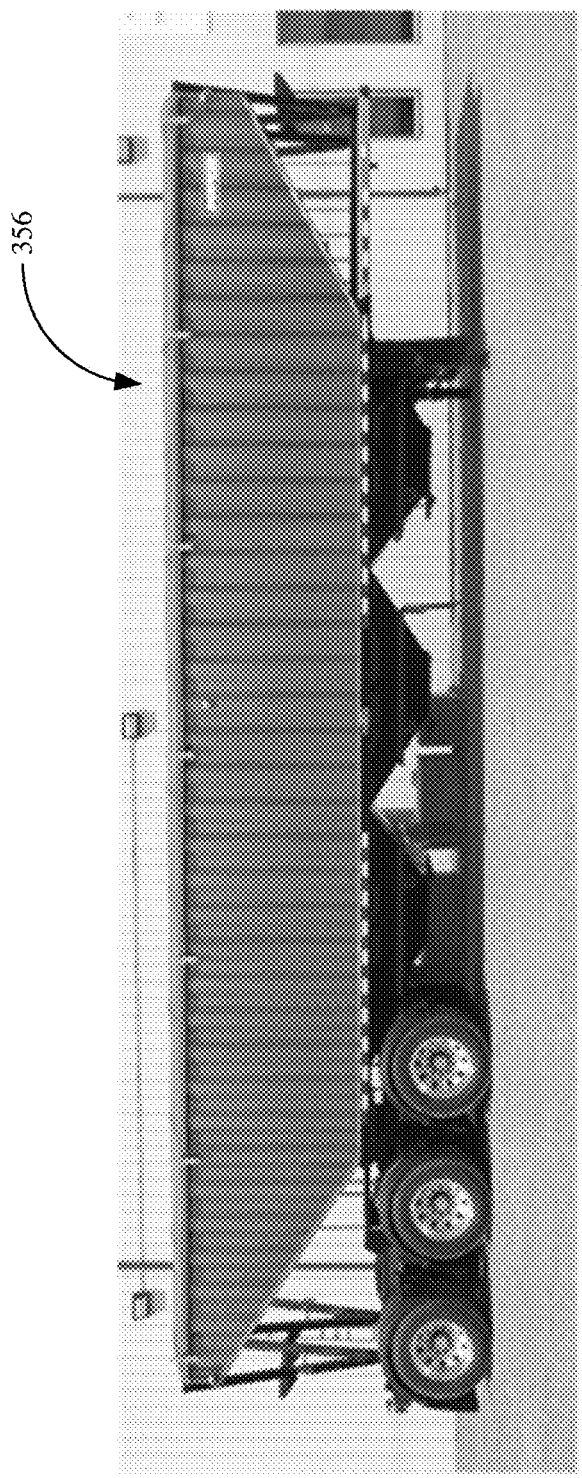
Figure 14E:
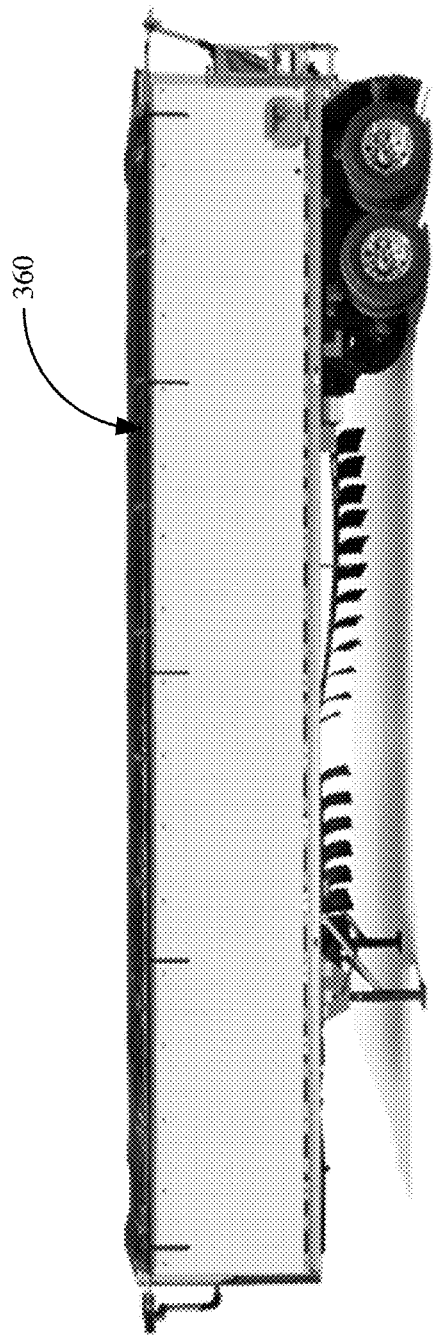

For instance, in one example, optical sensor 122 captures an image of the trailer 120 and image processor 172 processes that image to identify the type of trailer 120 that is about to be filled. In another example, operator 214 provides an operator input through operator interface 212 identifying the type of trailer. As examples of vehicle type, the haulage vehicle and/or trailer can be a single hopper haulage vehicle 354, a double hopper haulage vehicle 356, a triple hopper haulage vehicle 358, a belt trailer 360, or any of a wide variety of other types 362 of haulage vehicle. FIG. 14B shows one example of a single hopper haulage vehicle 354. FIG. 14C shows one example of a double hopper haulage vehicle 356. FIG. 14D shows an example of a triple hopper haulage vehicle 358, and FIG. 14E shows one example of belt trailer 360. It will be appreciated that the examples shown in FIGS. 14B-14E are only examples, and any of a wide variety of other types of haulage vehicles and/or trailers can be used as well.

Next, vehicle type ingestion system 222 accesses a source of internal profile data 137 that may be indexed based on haulage vehicle type. Vehicle type ingestion system 222 searches the data store to identify the internal geometry data corresponding to the identified haulage vehicle type, as indicated by block 364 in the flow diagram of FIG. 14A. For instance, it may be that data store 134 in material transfer control system 130 stores internal profile data 137 indexed by haulage vehicle type. In that case, once vehicle type ingestion system 222 knows the type of haulage vehicle, then system 222 can access (e.g., extract) the internal profile data 137 corresponding to that vehicle type.

Identifying the particular internal geometry for this vehicle type is indicated by block 366 in the flow diagram of FIG. 14A. Accessing or extracting the identified internal geometry for use by transfer strategy execution system 146 and/or control signal generator 150 and/or any other items in material transfer control system 130 is indicated by block 368 in the flow diagram of FIG. 14A.

It can thus be seen that the present description describes a system that identifies an internal geometry of a haulage vehicle 116/trailer 120. The system then uses that internal geometry to control transfer of material from a material transfer vehicle 104 into the haulage vehicle 116/trailer 120. By way of example, the material transfer operation can be controlled based upon estimated or detected volume or material transferred, using the internal geometry of the haulage vehicle 116/trailer 120. For example, the volume can be calculated by detecting the height of material transferred, or the material transfer can be controlled based upon a virtual transfer operation where the volume and/or height of material is estimated given the internal geometry of the haulage vehicle 116/trailer 120 and/or an estimated value or sensed value of the mass flow rate of material being transferred, the weight of material being transferred, or another value indicative of the amount of material being transferred. Using the internal geometry of the haulage vehicle 116/trailer 120 in this way enhances the accuracy of the material transfer operation in that the haulage vehicle/trailer can be filled to a desired height or volume, without spillage. Because the internal geometry of the haulage vehicle 116/trailer 120 is known, the material transfer need not be detected optically or visually during the material transfer operation in an environment where there is a large amount of dust or other obscurants and where the sides of the haulage vehicle 116/trailer 120 may be quite high making it difficult for an operator to observe the material transfer operation.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, subsystems, components, sensors and/or logic. It will be appreciated that such systems, subsystems, components, sensors and/or logic can be comprised of hardware items (such as processors and associated memory, or other processing components, some of which are described below) that perform the functions associated with those systems, subsystems, components, sensors and/or logic. In addition, the systems, subsystems, components, sensors and/or logic can be comprised of software that is loaded into a memory and is subsequently executed by a processor or server, or other computing component, as described below. The systems, subsystems, components, sensors and/or logic can also be comprised of different combinations of hardware, software, firmware, etc., some examples of which are described below. These are only some examples of different structures that can be used to form the systems, subsystems, components, sensors and/or logic described above. Other structures can be used as well.

Figure 15:
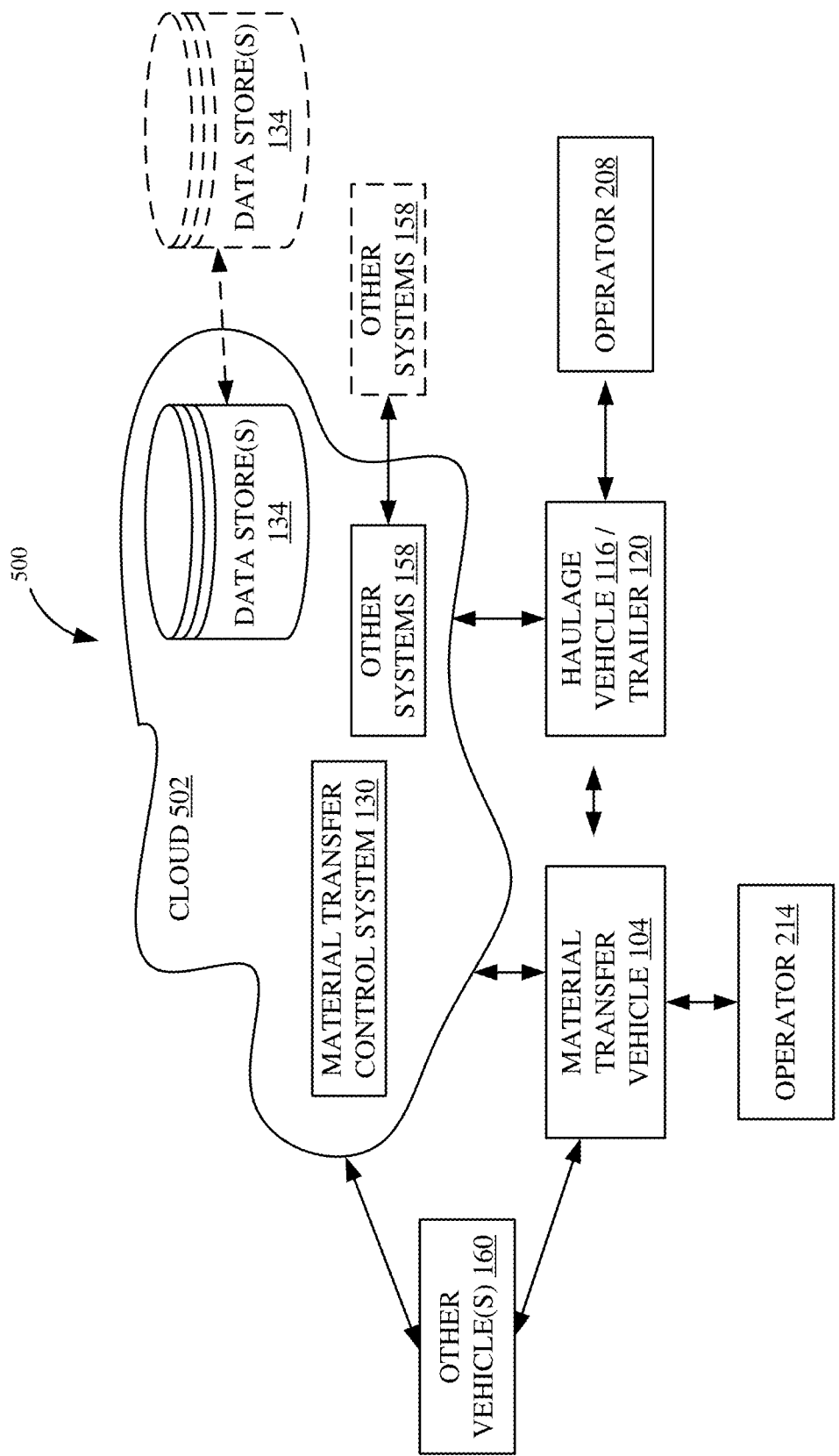
FIG. 15 is a block diagram showing one example of an agricultural system deployed in a remote server environment.

FIG. 15 is a block diagram of system 100, shown in FIGS. 1 and 6, except that it is deployed in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they components and functions can be provided from a conventional server, or they can be installed on client devices directly, or in other ways.

In the example shown in FIG. 15, some items are similar to those shown in previous FIGS. and they are similarly numbered. FIG. 15 specifically shows that material transfer control system 130, other systems 158, and/or data store 134 can be located at a remote server location 502. Therefore, items in system 100 access those systems through remote server location 502. Also, FIG. 15 shows that an operator 506 can operate haulage vehicle 116/trailer 120 and communicate with other items in the system 100.

FIG. 15 also depicts another example of a remote server architecture. FIG. 15 shows that it is also contemplated that some elements of previous FIGS are disposed at remote server location 502 while others are not. By way of example, data store 134 can be disposed at a location separate from location 502, and accessed through the remote server at location 502. Regardless of where the items are located, the items can be accessed directly by machines 102, 104, 116, 120, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine comes close to the fuel truck for fueling, the system automatically collects the information from the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 16:
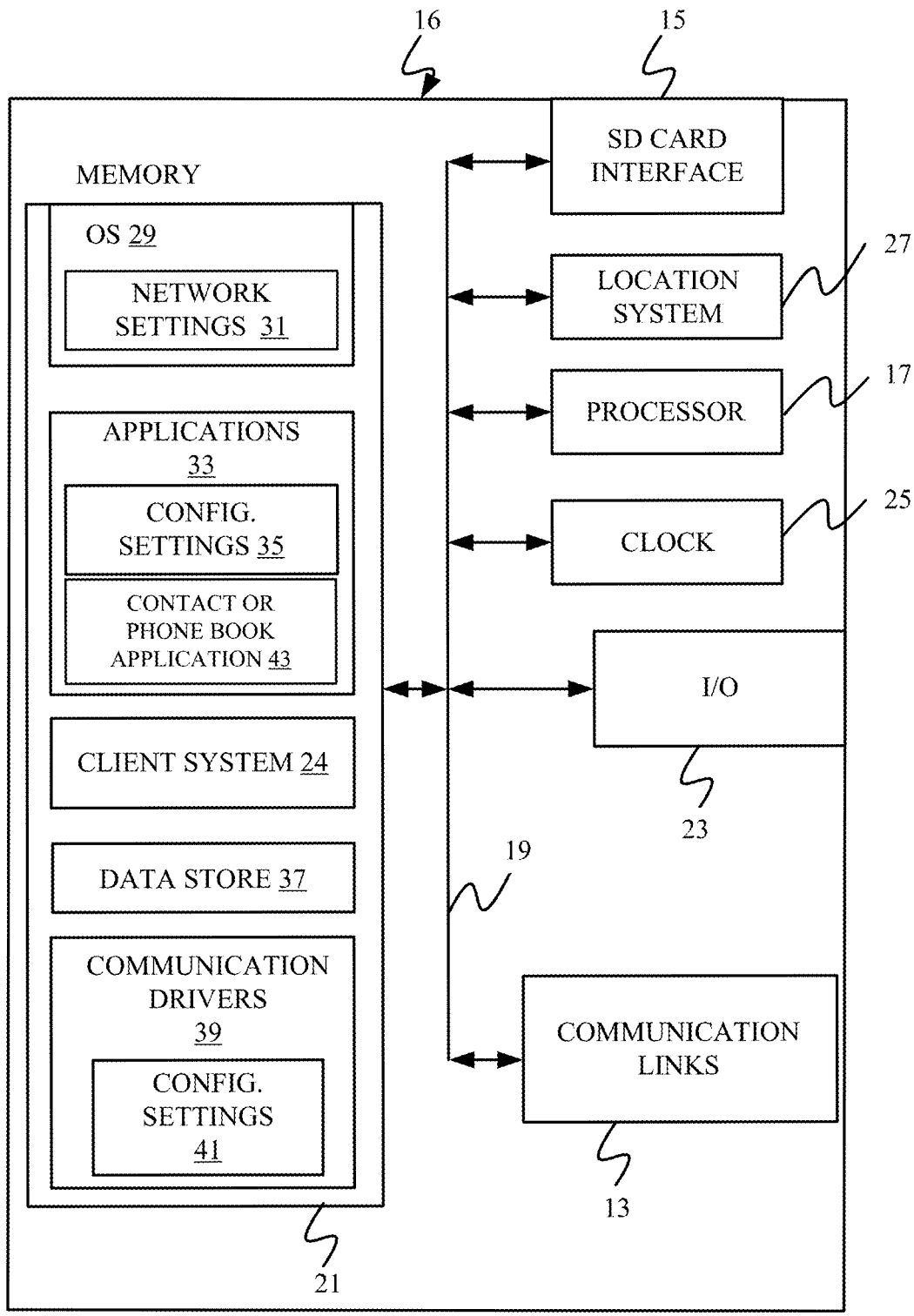
FIGS. 16-18 show examples of mobile devices that can be used in the systems and machines illustrated in other FIGS.
Figure 17:
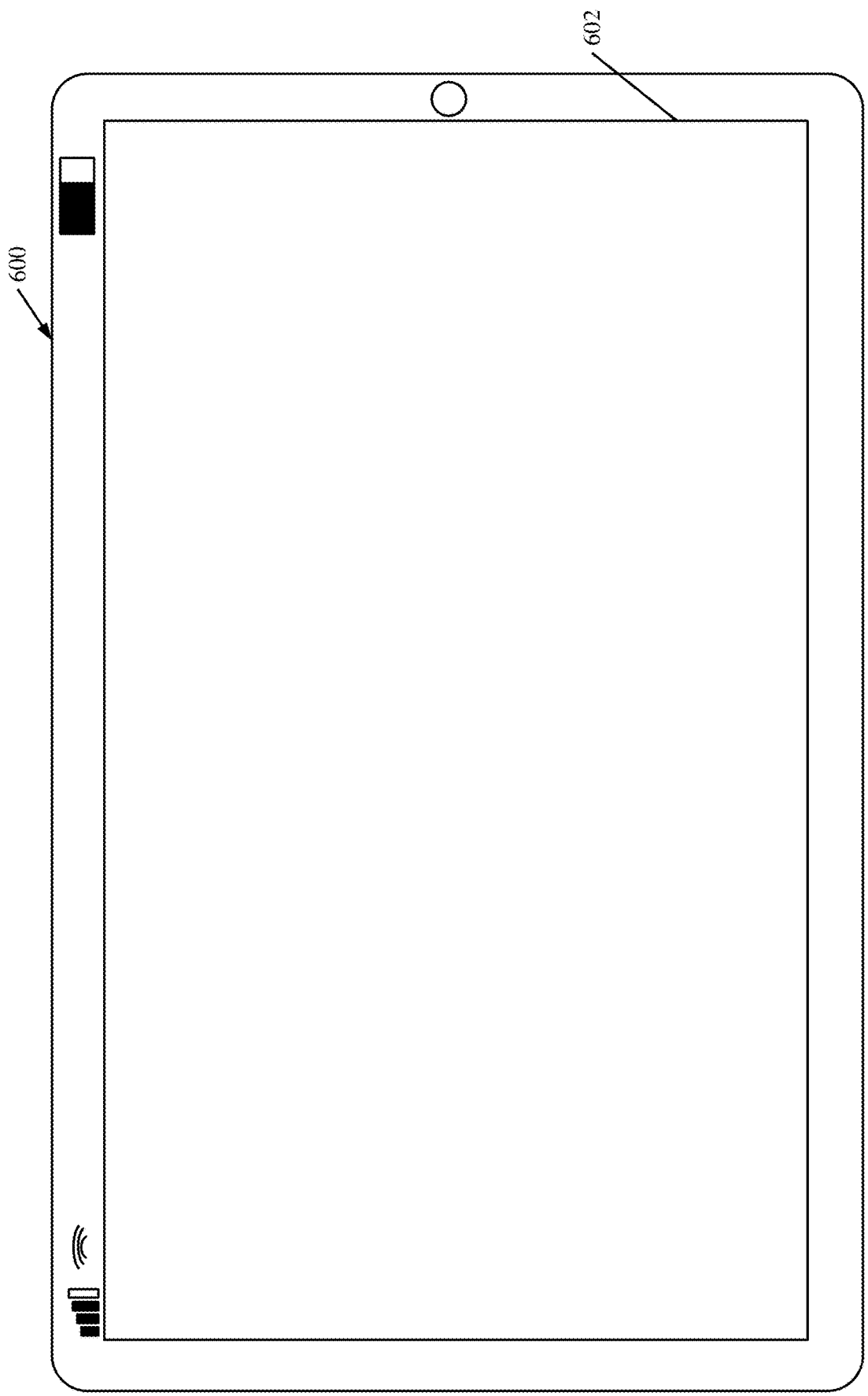
Figure 18:
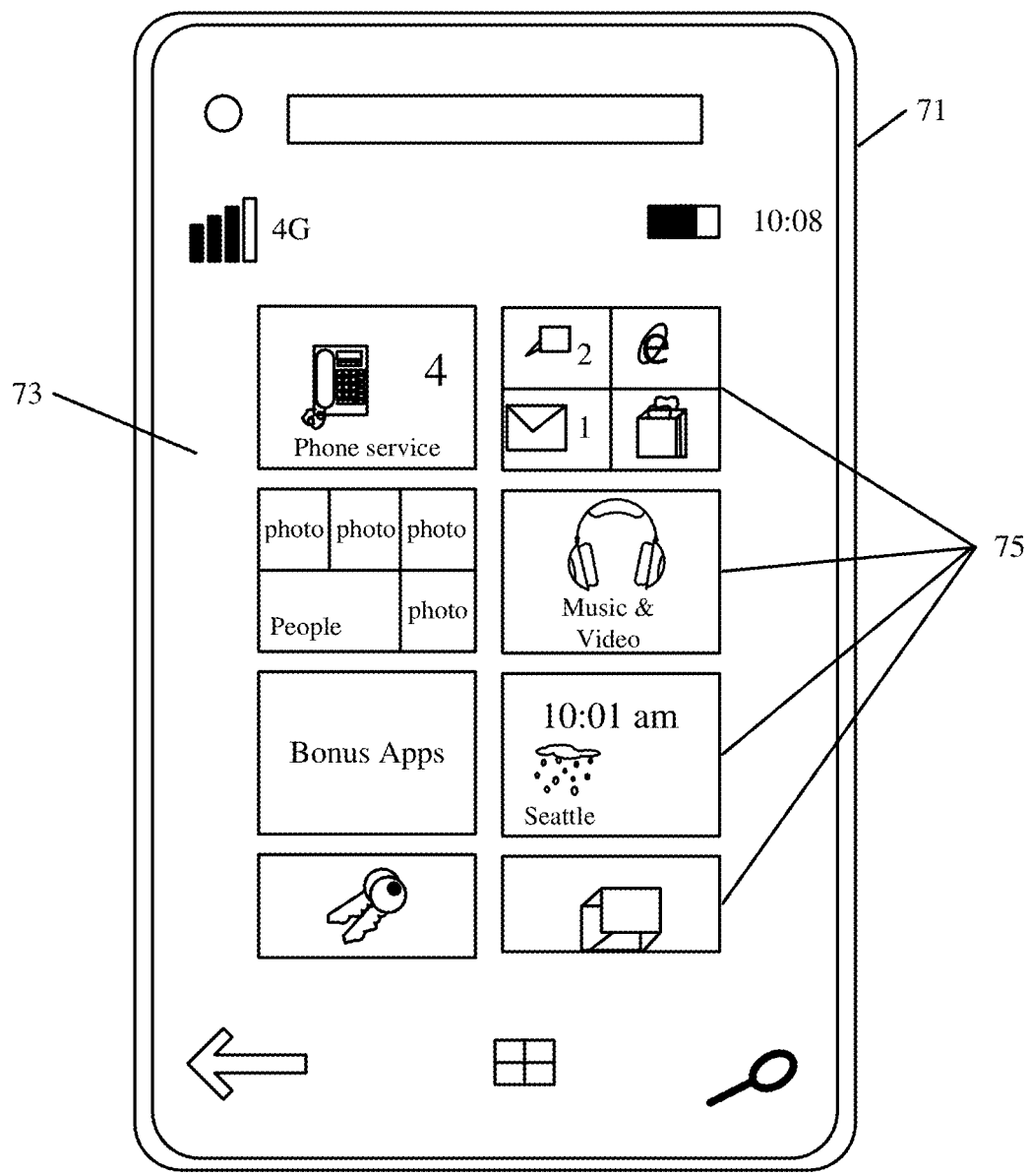

FIG. 16 is a simplified block diagram of one illustrative example of a handheld or mobile computing device that can be used as a user's or client's hand held device 16, in which the present system (or parts of it) can be deployed. For instance, a mobile device can be deployed in the operator compartment of material transfer vehicle 104 for use in generating, processing, or displaying the position and control data. FIGS. 17-18 are examples of handheld or mobile devices.

FIG. 16 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 17 shows one example in which device 16 is a tablet computer 600. In FIG. 11, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 18 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 19:
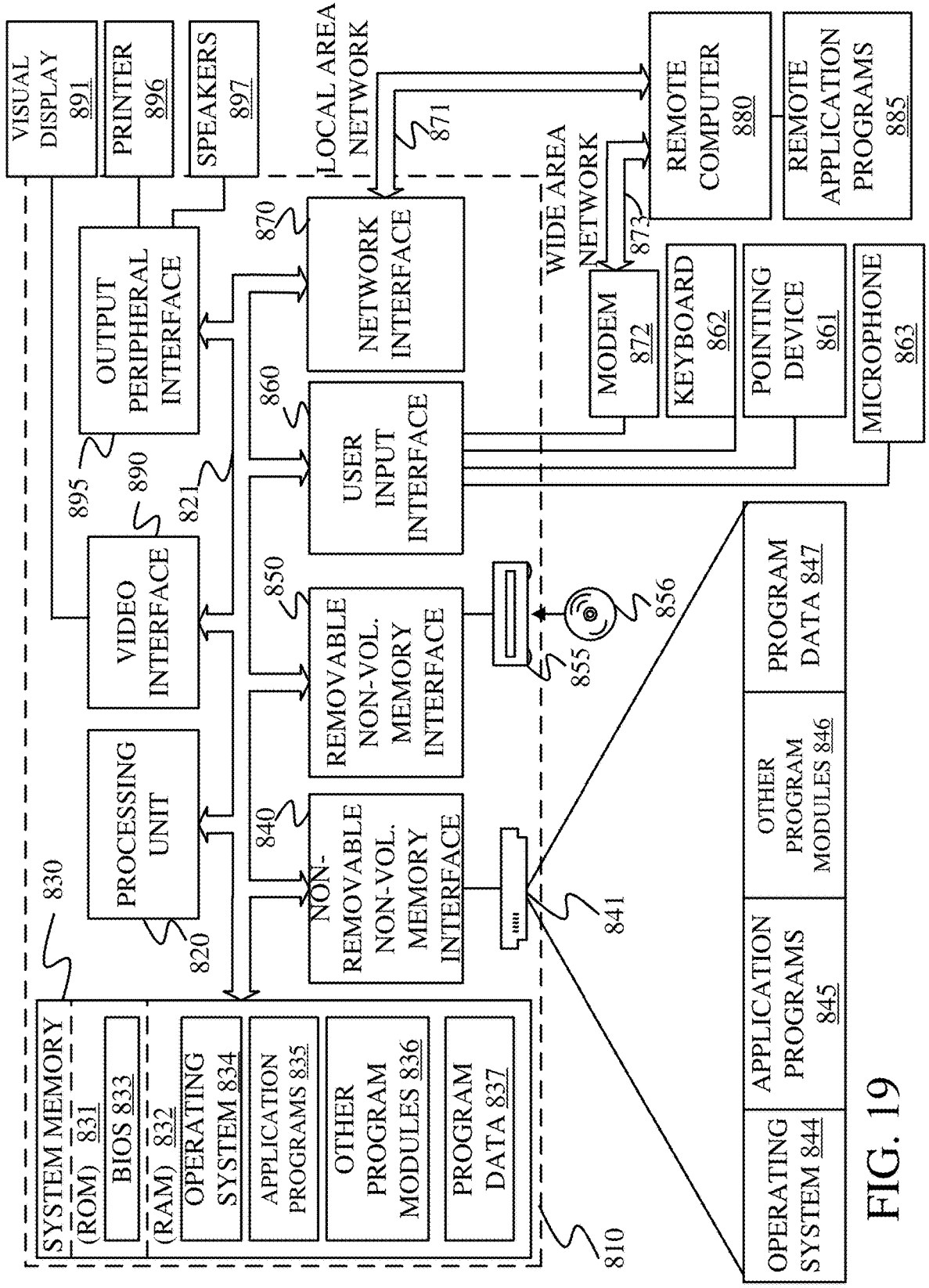
FIG. 19 is a block diagram showing one example of a computing environment that can be used in the systems and machines shown in other FIGS.

FIG. 19 is one example of a computing environment in which elements of previous FIGS., or parts of it, (for example) can be deployed. With reference to FIG. 19, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 19.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 19 illustrates operating system 834, application programs 835, other program modules 836, and program data 837.

The computer 810 may also include other removable/non-removable volatile/nonvolatile computer storage media. By way of example only, FIG. 19 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 19, provide storage of computer readable instructions, data structures, program modules and other data for the computer 810. In FIG. 19, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 19 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a material transfer operation, the method comprising:
   determining that a material transfer operation is to be performed to transfer material from a material transfer vehicle to a haulage vehicle;
   accessing a representation of a haulage vehicle internal geometry corresponding to the haulage vehicle;
   identifying a plurality of discrete fill locations in the haulage vehicle based on the haulage vehicle internal geometry;
   detecting a fill level at each fill location of the plurality of discrete fill locations; and
   controlling the material transfer operation to transfer material from the material transfer vehicle to the haulage vehicle based on the detected fill level at each fill location of the plurality of discrete fill locations.

2. The method of claim 1 wherein accessing a representation of the haulage vehicle internal geometry comprises:
   detecting a vehicle identifier corresponding to the haulage vehicle;
   accessing, based on the vehicle identifier, computer aided design (CAD) file information corresponding to a CAD file representing the haulage vehicle; and
   controlling the material transfer operation based on the CAD file information.

3. The method of claim 2 wherein accessing the CAD file information comprises:
   receiving, at a remote server system, the CAD file;
   generating the CAD file information, based on the CAD file, at the remote server system;
   receiving, at the remote server system, the vehicle identifier from the material transfer vehicle; and
   sending the CAD file information to the material transfer vehicle.

4. The method of claim 1 wherein accessing a representation of the haulage vehicle internal geometry comprises:
   sensing a characteristic of the haulage vehicle with a sensor;
   generating a sensor signal responsive to the sensed characteristic; and
   generating the representation of the haulage vehicle internal geometry based on the sensor signal.

5. The method of claim 4 wherein sensing a characteristic of the haulage vehicle comprises:
   positioning the sensor in a calibration position; and
   scanning the haulage vehicle with the sensor to sense a geometry of the haulage vehicle.

6. The method of claim 1 wherein accessing a representation of the haulage vehicle internal geometry comprises:
   detecting a user input indicative of a characteristic of the haulage vehicle; and
   generating the representation of the haulage vehicle internal geometry based on the user input.

7. The method of claim 6 wherein detecting a user input comprises:
   displaying a representation of the haulage vehicle on a display device; and
   detecting a user input tracing a portion of the representation of the haulage vehicle on the display device.

8. The method of claim 7 wherein detecting a user input comprises:
   detecting a user input indicative of dimensional information corresponding to the haulage vehicle, wherein generating the representation of the haulage vehicle internal geometry comprises generating the representation of the haulage vehicle internal geometry based on the traced portion of the representation of the haulage vehicle and based on the dimensional information.

9. The method of claim 1 wherein accessing a representation of the haulage vehicle internal geometry comprises:
   detecting a vehicle type of the haulage vehicle; and
   accessing a representation of the haulage vehicle internal geometry based on the vehicle type.

10. The method of claim 1 wherein controlling the material transfer operation to transfer material from the material transfer vehicle to the haulage vehicle based on the representation of the haulage vehicle internal geometry comprises:
    determining a volume of the haulage vehicle based on the haulage vehicle internal geometry;
    identifying a volume of material transferred during the material transfer operation; and
    controlling the material transfer operation based on the volume of the haulage vehicle and the volume of material transferred.

11. The method of claim 10 wherein identifying a volume of material transferred comprises:
    sensing a characteristic of the material transfer operation; and
    estimating the volume of material transferred based on the sensed characteristic.

12. The method of claim 1, and further comprising:
    detecting a vehicle identifier corresponding to the haulage vehicle;
    communicating a representation of the vehicle identifier to a remote server system;
    receiving file information from the remote server system, wherein the file information is identified based on the representation of the vehicle identifier and represents the haulage vehicle internal geometry.

13. The method of claim 1, wherein the material comprises harvested agricultural material, and further comprising:
receiving, by the material transfer vehicle during a first material transfer operation, the harvested agricultural material from an agricultural harvesting machine, wherein controlling the material transfer operation comprises controlling a second material transfer operation to transfer the harvested agricultural material from the material transfer vehicle to the haulage vehicle.

14. A material transfer control system, comprising:
at least one processor; and
memory storing instructions executable by the at least one processor, wherein the instructions, when executed, cause the material transfer control system to:
display a representation of a haulage vehicle on a display device;
detect a user input tracing a portion of the representation of the haulage vehicle on the display device;
generate a representation of a haulage vehicle internal geometry corresponding to the haulage vehicle based on the user input; and
control a material conveyance subsystem on a material transfer vehicle to perform a material transfer operation that transfers material from the material transfer vehicle to the haulage vehicle based on the representation of the haulage vehicle internal geometry.

15. The material transfer control system of claim 14 wherein the instructions, when executed, cause the material transfer control system to:
detect a vehicle identifier corresponding to the haulage vehicle, access CAD file information, corresponding to a CAD file representing the haulage vehicle, based on the vehicle identifier.

16. The material transfer control system of claim 14 wherein the instructions, when executed, cause the material transfer control system to:
sense a characteristic of the haulage vehicle;
generate a sensor signal responsive to the sensed characteristic; and
generate the representation of the haulage vehicle internal geometry based on the sensor signal.

17. The material transfer control system of claim 14 wherein the instructions, when executed, cause the material transfer control system to:
detect a vehicle type of the haulage vehicle and access a representation of the haulage vehicle internal geometry based on the vehicle type.

18. The material transfer control system of claim 14 wherein the instructions, when executed, cause the material transfer control system to:
determine a volume of the haulage vehicle based on the haulage vehicle internal geometry;
identify a volume of material transferred during the material transfer operation; and
control the material transfer operation based on the volume of the haulage vehicle and the volume of material transferred.

19. A material transfer control system, comprising:
at least one processor; and
memory storing instructions executable by the at least one processor, wherein the instructions, when executed, cause the material transfer control system to:
determine that a material transfer operation is to be performed to transfer material from a material transfer vehicle to a haulage vehicle;
access a representation of a haulage vehicle internal geometry corresponding to the haulage vehicle;
identify a plurality of discrete fill locations in the haulage vehicle based on the haulage vehicle internal geometry;
detect a plurality of discrete fill levels, each respective discrete fill level, of the plurality of discrete fill levels, representing material fill at a respective discrete fill location of the plurality of discrete fill locations; and
control the material transfer operation to transfer material from the material transfer vehicle to the haulage vehicle based on the plurality of discrete fill levels.

20. The material transfer control system of claim 19, wherein the instructions, when executed, cause the material transfer control system to:
execute a transfer strategy to control a material conveyance subsystem based on the plurality of discrete fill levels and the plurality of discrete fill locations in the haulage vehicle.

* * * * *